(12) United States Patent
Passot et al.

(10) Patent No.: US 10,507,580 B2
(45) Date of Patent: Dec. 17, 2019

(54) REDUCED DEGREE OF FREEDOM ROBOTIC CONTROLLER APPARATUS AND METHODS

(71) Applicant: Brain Corporation, San Diego, CA (US)

(72) Inventors: Jean-Baptiste Passot, Solana Beach, CA (US); Oleg Sinyavskiy, San Diego, CA (US); Eugene Izhikevich, San Diego, CA (US)

(73) Assignee: Brain Corporation, San Diego, CA (US)

( * ) Notice: Subject to any disclaimer, the term of this patent is extended or adjusted under 35 U.S.C. 154(b) by 19 days.

(21) Appl. No.: 15/967,240

(22) Filed: Apr. 30, 2018

(65) Prior Publication Data

US 2018/0243903 A1 Aug. 30, 2018

Related U.S. Application Data

(63) Continuation of application No. 14/070,239, filed on Nov. 1, 2013, now abandoned.

(51) Int. Cl.
*G06F 19/00* (2018.01)
*B25J 9/16* (2006.01)
(Continued)

(52) U.S. Cl.
CPC .............. *B25J 9/163* (2013.01); *B25J 9/161* (2013.01); *G06N 3/008* (2013.01); *G06N 3/049* (2013.01);
(Continued)

(58) Field of Classification Search
CPC ........ G05B 19/042; G05B 2219/25323; G05B 19/0426; G05B 2219/23026;
(Continued)

(56) References Cited

U.S. PATENT DOCUMENTS 4,763,276 A * 8/1988 Perreirra ................ B25J 9/1653
700/254
8,849,735 B2 * 9/2014 Izhikevich ............. G06N 3/049
706/25

(Continued)

*Primary Examiner* — Ronnie M Mancho
(74) *Attorney, Agent, or Firm* — Reed Smith LLP; Sidharth Kapoor

(57) ABSTRACT

Apparatus and methods for training and controlling of, for instance, robotic devices. In one implementation, a robot may be trained by a user using supervised learning. The user may be unable to control all degrees of freedom of the robot simultaneously. The user may interface to the robot via a control apparatus configured to select and operate a subset of the robot's complement of actuators. The robot may comprise an adaptive controller comprising a neuron network. The adaptive controller may be configured to generate actuator control commands based on the user input and output of the learning process. Training of the adaptive controller may comprise partial set training. The user may train the adaptive controller to operate first actuator subset. Subsequent to learning to operate the first subset, the adaptive controller may be trained to operate another subset of degrees of freedom based on user input via the control apparatus.

20 Claims, 10 Drawing Sheets

(51) Int. Cl.
- *G06N 3/04* (2006.01)
- *G06N 3/00* (2006.01)
- *G06N 20/00* (2019.01)
- *G06N 3/08* (2006.01)
- *G06N 3/063* (2006.01)

(52) U.S. Cl.
CPC ............... *G06N 3/063* (2013.01); *G06N 3/08* (2013.01); *G06N 20/00* (2019.01); *G05B 2219/33034* (2013.01); *G05B 2219/39289* (2013.01); *G05B 2219/39298* (2013.01); *Y10S 901/03* (2013.01)

(58) Field of Classification Search
CPC ............ G05B 19/41885; G05B 13/027; G05B 13/0285; G05B 19/416; G05B 19/425; G05B 2219/45083; G05B 2219/49195; G06F 3/048; G06F 3/00; G06F 3/0219; G06F 3/0233; G06F 3/0238; G06F 9/4443; G06N 3/008; G06N 3/049; G06N 99/005; B25J 9/163; B25J 9/161; B25J 9/1653; B25J 9/1682; B25J 9/1692; Y10S 901/03; Y10S 901/50

USPC .................................................. 700/245, 257
See application file for complete search history.

(56) References Cited

U.S. PATENT DOCUMENTS

| | | | |
|---|---|---|---|
| 9,152,915 B1* | 10/2015 | Gabardos | G06N 3/02 |
| 9,186,793 B1* | 11/2015 | Meier | B25J 9/1694 |
| 9,242,372 B2* | 1/2016 | Laurent | B25J 9/161 |
| 9,314,924 B1* | 4/2016 | Laurent | B25J 9/163 |
| 9,436,908 B2* | 9/2016 | Piekniewski | G06N 3/02 |
| 9,764,468 B2* | 9/2017 | Izhikevich | B25J 9/163 |
| 9,792,546 B2* | 10/2017 | Passot | G06N 3/049 |
| 2013/0151450 A1* | 6/2013 | Ponulak | G06N 3/049 706/25 |
| 2013/0297541 A1* | 11/2013 | Piekniewski | G06N 3/049 706/26 |
| 2014/0052679 A1* | 2/2014 | Sinyavskiy | G06N 3/10 706/25 |
| 2014/0277718 A1* | 9/2014 | Izhikevich | B25J 9/163 700/250 |
| 2014/0317035 A1* | 10/2014 | Szatmary | G06N 3/049 706/27 |

* cited by examiner

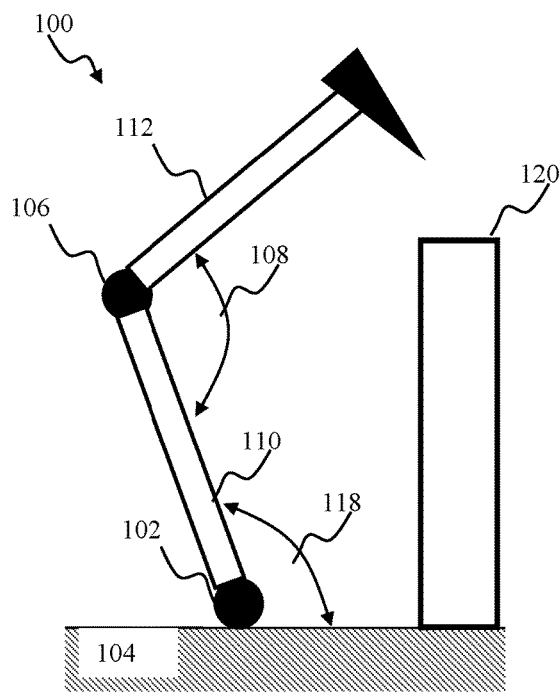
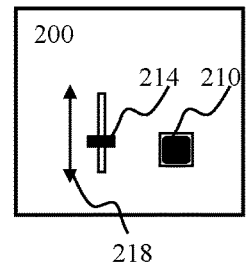
FIG. 1
FIG. 2
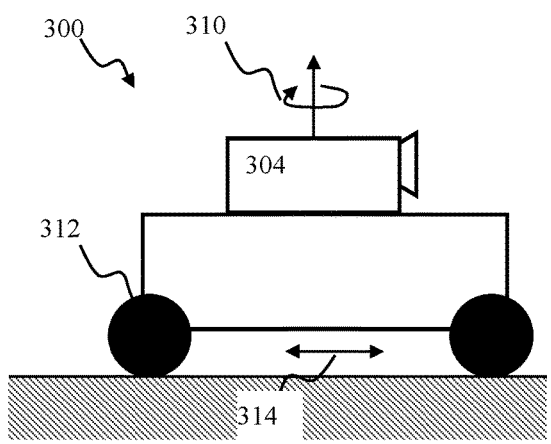
FIG. 3

REDUCED DEGREE OF FREEDOM ROBOTIC CONTROLLER APPARATUS AND METHODS

PRIORITY

This application is a continuation of and claims the benefit of priority to co-pending and co-owned U.S. patent application Ser. No. 14/070,239 of the same title filed on Nov. 1, 2013, which is incorporated herein by reference in its entirety.

CROSS-REFERENCE TO RELATED APPLICATIONS

This application is related to and co-owned U.S. patent application Ser. No. 14/070,269, entitled "APPARATUS AND METHODS FOR OPERATING ROBOTIC DEVICES USING SELECTIVE STATE SPACE TRAINING", filed Nov. 1, 2013, and U.S. patent application Ser. No. 14/070,114 entitled "APPARATUS AND METHODS FOR ONLINE TRAINING OF ROBOTS", filed Nov. 1, 2013, each of the foregoing being incorporated herein by reference in its entirety.

This application is also related to commonly owned and/or co-pending U.S. patent application Ser. No. 13/866,975, entitled "APPARATUS AND METHODS FOR REINFORCEMENT-GUIDED SUPERVISED LEARNING", filed Apr. 19, 2013, Ser. No. 13/918,338 entitled "ROBOTIC TRAINING APPARATUS AND METHODS", filed Jun. 14, 2013, Ser. No. 13/918,298, entitled "HIERARCHICAL ROBOTIC CONTROLLER APPARATUS AND METHODS", filed Jun. 14, 2013, Ser. No. 13/907,734, entitled "ADAPTIVE ROBOTIC INTERFACE APPARATUS AND METHODS", filed May 31, 2013, Ser. No. 13/842,530, entitled "ADAPTIVE PREDICTOR APPARATUS AND METHODS", filed Mar. 15, 2013, Ser. No. 13/842,562, entitled "ADAPTIVE PREDICTOR APPARATUS AND METHODS FOR ROBOTIC CONTROL", filed Mar. 15, 2013, Ser. No. 13/842,616, entitled "ROBOTIC APPARATUS AND METHODS FOR DEVELOPING A HIERARCHY OF MOTOR PRIMITIVES", filed Mar. 15, 2013, Ser. No. 13/842,647, entitled "MULTICHANNEL ROBOTIC CONTROLLER APPARATUS AND METHODS", filed Mar. 15, 2013, Ser. No. 13/842,583, entitled "APPARATUS AND METHODS FOR TRAINING OF ROBOTIC DEVICES", filed Mar. 15, 2013, Ser. No. 13/152,084, filed Jun. 2, 2011, entitled "APPARATUS AND METHODS FOR PULSE-CODE INVARIANT OBJECT RECOGNITION", Ser. No. 13/757,607, filed Feb. 1, 2013, entitled "TEMPORAL WINNER TAKES ALL SPIKING NEURON NETWORK SENSORY PROCESSING APPARATUS AND METHODS", Ser. No. 13/623,820, filed Sep. 20, 2012, entitled "APPARATUS AND METHODS FOR ENCODING OF SENSORY DATA USING ARTIFICIAL SPIKING NEURONS", Ser. No. 13/623,842, entitled "SPIKING NEURON NETWORK ADAPTIVE CONTROL APPARATUS AND METHODS", filed Sep. 20, 2012, Ser. No. 13/487,499, entitled "STOCHASTIC APPARATUS AND METHODS FOR IMPLEMENTING GENERALIZED LEARNING RULES" filed Jun. 4, 2012, Ser. No. 13/465,903 entitled "SENSORY INPUT PROCESSING APPARATUS IN A SPIKING NEURAL NETWORK", filed May 7, 2012, Ser. No. 13/488,106, entitled "SPIKING NEURON NETWORK APPARATUS AND METHODS", filed Jun. 4, 2012, Ser. No. 13/541,531, entitled "CONDITIONAL PLASTICITY SPIKING NEURON NETWORK APPARATUS AND METHODS", filed Jul. 3, 2012, Ser. No. 13/691,554, entitled "RATE STABILIZATION THROUGH PLASTICITY IN SPIKING NEURON NETWORK", filed Nov. 30, 2012, Ser. No. 13/660,967, entitled "APPARATUS AND METHODS FOR ACTIVITY-BASED PLASTICITY IN A SPIKING NEURON NETWORK" filed Oct. 25, 2012, Ser. No. 13/660,945, entitled "MODULATED PLASTICITY APPARATUS AND METHODS FOR SPIKING NEURON NETWORK", filed Oct. 25, 2012, Ser. No. 13/774,934, entitled "APPARATUS AND METHODS FOR RATE-MODULATED PLASTICITY IN A SPIKING NEURON NETWORK", filed Feb. 22, 2013, Ser. No. 13/763,005, entitled "SPIKING NETWORK APPARATUS AND METHOD WITH BIMODAL SPIKE-TIMING DEPENDENT PLASTICITY", filed Feb. 8, 2013, Ser. No. 13/660,923, entitled "ADAPTIVE PLASTICITY APPARATUS AND METHODS FOR SPIKING NEURON NETWORK", filed Oct. 25, 2012, Ser. No. 13/239,255 filed Sep. 21, 2011, entitled "APPARATUS AND METHODS FOR SYNAPTIC UPDATE IN A PULSE-CODED NETWORK", Ser. No. 13/588,774, entitled "APPARATUS AND METHODS FOR IMPLEMENTING EVENT-BASED UPDATES IN SPIKING NEURON NETWORKS", filed Aug. 17, 2012, Ser. No. 13/560,891 entitled "APPARATUS AND METHODS FOR EFFICIENT UPDATES IN SPIKING NEURON NETWORK" filed Jul. 27, 2012, Ser. No. 13/560,902, entitled "APPARATUS AND METHODS FOR STATE-DEPENDENT LEARNING IN SPIKING NEURON NETWORKS", filed Jul. 27, 2012, Ser. No. 13/722,769 filed Dec. 20, 2012, and entitled "APPARATUS AND METHODS FOR STATE-DEPENDENT LEARNING IN SPIKING NEURON NETWORKS", Ser. No. 13/842,530 entitled "ADAPTIVE PREDICTOR APPARATUS AND METHODS", filed Mar. 15, 2013, Ser. No. 13/239,255 filed Sep. 21, 2011, entitled "APPARATUS AND METHODS FOR SYNAPTIC UPDATE IN A PULSE-CODED NETWORK", Ser. No. 13/487,576 entitled "DYNAMICALLY RECONFIGURABLE STOCHASTIC LEARNING APPARATUS AND METHODS", filed Jun. 4, 2012; and commonly owned U.S. Pat. No. 8,315,305, issued Nov. 20, 2012, entitled "SYSTEMS AND METHODS FOR INVARIANT PULSE LATENCY CODING"; each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present disclosure relates to adaptive control and training, such as control and training of robotic devices.

Background

Robotic devices are used in a variety of industries, such as manufacturing, medical, safety, military, exploration, etc. Robotic "autonomy", i.e., the degree of human control, varies significantly according to application. Some existing robotic devices (e.g., manufacturing assembly and/or packaging) may be programmed in order to perform desired functionality without further supervision. Some robotic devices (e.g., surgical robots) may be controlled by humans.

Robotic devices may comprise hardware components that enable the robot to perform actions in 1-dimension (e.g., a single range of movement), 2-dimensions (e.g., a plane of movement), and/or 3-dimensions (e.g., a space of movement). Typically, movement is characterized according to so-called "degrees of freedom". A degree of freedom is an independent range of movement; a mechanism with a number of possible independent relative movements (N) is said to have N degrees of freedom. Some robotic devices may operate with multiple degrees of freedom (e.g., a turret and/or a crane arm configured to rotate around vertical and/or horizontal axes). It is further appreciated that some robotic devices may simultaneously control multiple actuators (degrees of freedom) resulting in very complex movements.

SUMMARY

One aspect of the disclosure relates to a non-transitory computer readable medium having instructions embodied thereon. The instructions, when executed, are configured to control a robotic platform.

In another aspect, a user interface apparatus is disclosed. In one implementation, the apparatus is for use with a robotic apparatus having a controller, and includes: user input apparatus; and first computerized logic in data communication with the input apparatus and configured to, as part of a first operational iteration, provide an input to the controller. In one variant, the input is associated with operation of one of first and second degrees of freedom of the robotic apparatus, and is configured to enable the controller to produce: a first control signal to control the first degree of freedom; and a second control signal to control the second degree of freedom, the second control signal being determined based at least on another input being provided via the input apparatus at another iteration, the another input being associated with the second degree of freedom. The given iteration and the another iteration may be characterized by one or more features, such as e.g., an empty intersection.

In another variant, the apparatus further includes switching logic), wherein the switching logic comprises one or more of: (i) a button, (ii) a switch, (iii) a timer, (iv) condition determination logic, (v) logic configured to determine a state of the robotic apparatus, (vi) performance measurement determination logic; and/or (vii) an audio indication detection logic.

In another aspect, a method of training an adaptive controller apparatus is disclosed. In one implementation, the controller apparatus is associated with a robot comprising first and second degrees of freedom, and the method includes: during a first operational iteration: causing the apparatus to produce a first control signal based at least on a context and a first training input, the first control signal being configured to operate the first degree of freedom to execute a first action; and; causing the apparatus to adjust a learning parameter based at least on a first performance relating to the first action and a target action.

In one variant, the method further includes, during a subsequent iteration: causing the apparatus to produce a second control signal based at least on the context and a second training input, the second control signal being configured to operate the second degree of freedom; and causing the apparatus to produce a third control signal based at least on the context and the adjusted learning parameter, the third control signal being configured to operate the first degree of freedom.

In yet another variant, the second and the third control signals cooperate to cause execution of the target action.

In another aspect, a robotic apparatus is disclosed. In one implementation, the apparatus includes: a platform characterized by at least first and second degrees of freedom; and an adaptive controller apparatus configured to generate first and a second control signals adapted to operate the first and the second degrees of freedom, respectively.

In one variant, the first and the second control signals are configured to cause the platform to perform a target action; and the operation of a given one of the first or the second degrees of freedom is configured based at least on a training input associated with the given degree of freedom.

In another variant, the adaptive controller apparatus is operable in accordance with a supervised learning process configured to produce one of the first or the second control signals at a given iteration based on at least the training input.

In a further aspect, a robotic system is disclosed. In one implementation, the system includes a controlled (robotic) apparatus having multiple degrees of freedom, and an adaptive controller configured to receive input from a supervisory entity (e.g., user, algorithm, etc.) and utilize the input to train the robotic apparatus for subsequent iterations of movement within the degrees of freedom.

These and other features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

FIG. 1 is a graphical illustration depicting a robotic manipulator apparatus operable in two degrees of freedom, according to one or more implementations.

FIG. 2 is a graphical illustration depicting a robotic control apparatus configured to activate a single robotic actuator at a given time, according to one or more implementations.

FIG. 3 is a graphical illustration depicting a robotic rover platform operable in two degrees of freedom, according to one or more implementations.

Figure 4:
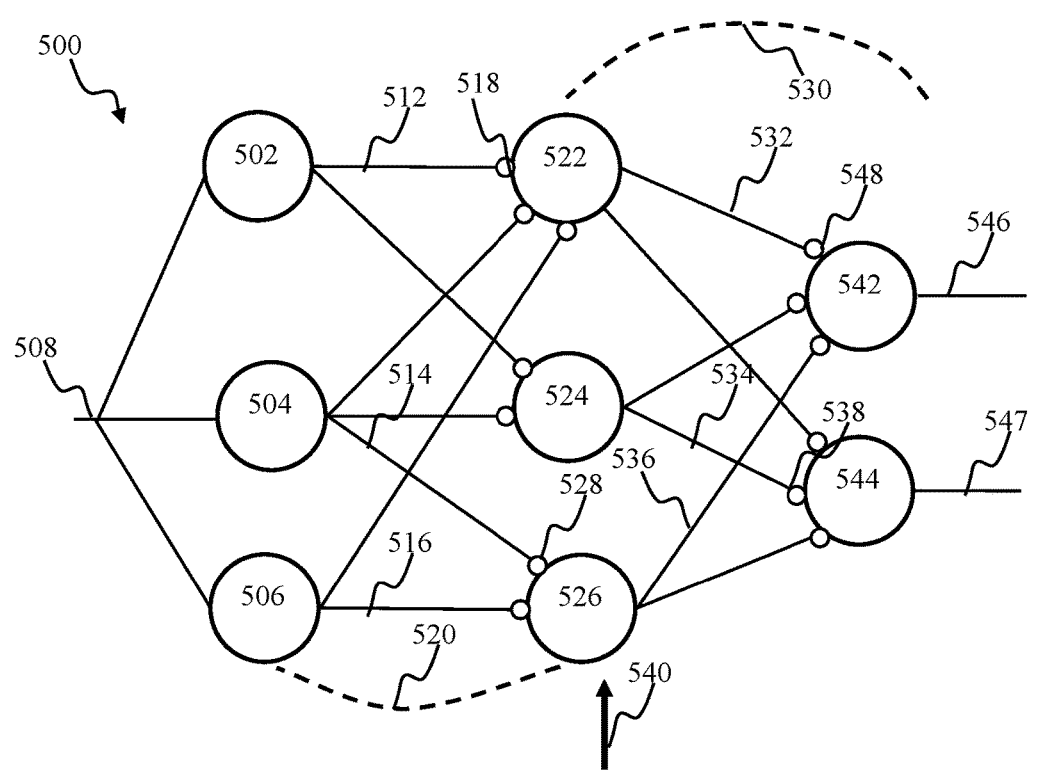
FIG. 4 is a graphical illustration depicting a multilayer neuron network configured to operate multiple degrees of freedom of, e.g., a robotic apparatus of FIG. 1, according to one or more implementations.

All Figures disclosed herein are © Copyright 2013 Brain Corporation. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation, but other implementations are possible by way of interchange of, or combination with, some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present technology will be described, and detailed descriptions of other portions of such known components will be omitted so as not to obscure the disclosure.

In the present specification, an implementation showing a singular component should not be considered limiting; rather, the disclosure is intended to encompass other implementations including a plurality of the same components, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that are used to access the synaptic and neuron memory. The "bus" may be electrical, optical, wireless, infrared, and/or any type of communication medium. The exact topology of the bus could be, for example: a standard "bus", a hierarchical bus, a network-on-chip, an address-event-representation (AER) connection, and/or any other type of communication topology configured to access e.g., different memories in a pulse-based system.

As used herein, the terms "computer", "computing device", and "computerized device" may include one or more of personal computers (PCs) and/or minicomputers (e.g., desktop, laptop, and/or other PCs), mainframe computers, workstations, servers, personal digital assistants (PDAs), handheld computers, embedded computers, programmable logic devices, personal communicators, tablet computers, portable navigation aids, J2ME equipped devices, cellular telephones, smart phones, personal integrated communication and/or entertainment devices, and/or any other device capable of executing a set of instructions and processing an incoming data signal.

As used herein, the term "computer program" or "software" may include any sequence of human and/or machine cognizable steps which perform a function. Such program may be rendered in a programming language and/or environment including one or more of C/C++, C#, Fortran, COBOL, MATLAB™, PASCAL, Python, assembly language, markup languages (e.g., HTML, SGML, XML, VoXML), object-oriented environments (e.g., Common Object Request Broker Architecture (CORBA)), Java™ (e.g., J2ME, Java Beans), Binary Runtime Environment (e.g., BREW), and/or other programming languages and/or environments.

As used herein, the terms "synaptic channel", "connection", "link", "transmission channel", "delay line", and "communications channel" include a link between any two or more entities (whether physical (wired or wireless), or logical/virtual) which enables information exchange between the entities, and may be characterized by a one or more variables affecting the information exchange.

As used herein, the term "memory" may include an integrated circuit and/or other storage device adapted for storing digital data. By way of non-limiting example, memory may include one or more of ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other types of memory.

As used herein, the terms "integrated circuit (IC)", and "chip" are meant to refer without limitation to an electronic circuit manufactured by the patterned diffusion of elements in or on to the surface of a thin substrate. By way of non-limiting example, integrated circuits may include field programmable gate arrays (e.g., FPGAs), programmable logic devices (PLD), reconfigurable computer fabrics (RCFs), application-specific integrated circuits (ASICs), printed circuits, organic circuits, and/or other types of computational circuits.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

Overview and Description of Exemplary Implementations

Apparatus and methods for training and controlling of robotic devices are disclosed. A robot may be trained by a user using a supervised learning approach. The user may interface to the robot via a control apparatus. During training and/or operation, the user may be unable to control a target number of controllable degrees of freedom (CDOF) of the robot simultaneously. For example, the user's inability to control the target number of the robot's CDOF may arise from a mismatch between configurations of the remote control (e.g., a single axis joystick and or slider) and the robot's capabilities (e.g., a rover with multi-axes actuators). In some implementations, the user's inability to simultaneously operate the target number of robot's CDOF may be due to a physical and/or mental complexity of the task arising from e.g., controlling multiple CDOF simultaneously in multiple spatial dimensions (e.g., a user attempting to train a robotic manipulator arm with six or more CDOF), user dexterity, and/or other considerations.

The robot may implement an adaptive controller implemented using e.g., a neuron network. Training the adaptive controller may comprise partial set training during so-called "trials". The user may train the adaptive controller to separately train a first actuator subset and a second actuator subset of the robot. During a first set of trials, the control apparatus may be configured to select and operate a first subset of the robot's complement of actuators e.g., operate a shoulder joint of a manipulator arm. The adaptive controller network may be configured to generate control commands for the shoulder joint actuator based on the user input and output of the learning process. However, since a single actuator (e.g., the shoulder joint) may be inadequate for achieving a target task (e.g., reaching a target object), subsequently thereafter the adaptive controller may be trained to operate the second subset (e.g., an elbow joint) during a second set of trials. During individual trials of the second set of trials, the user may provide control input for the second actuator, while the previously trained network may provide control signaling for the first actuator (the shoulder). Subsequent to performing the second set of trials, the adaptive controller may be capable of controlling the first and the second actuators in absence of user input by e.g., combining the training of the first and second trials.

FIG. 1 illustrates one implementation of a robotic apparatus for use with the robot training methodology set forth herein. The apparatus 100 of FIG. 1 may comprise a manipulator arm comprised of limbs 110, 112. The limb 110 orientation may be controlled by a motorized joint 102, the limb 112 orientation may be controlled by a motorized joint 106. The joints 102, 106 may enable control of the arm 100 in two degrees of freedom, shown by arrows 108, 118 in FIG. 1. The robotic arm apparatus 100 may be controlled in order to perform one or more target actions, e.g., reach a target 120.

In some implementations, the arm 100 may be controlled using an adaptive controller (e.g., comprising a neuron network described below with respect to FIGS. 4-5). The controller may be operable in accordance with a supervised learning process described in e.g., commonly owned, and co-pending U.S. patent application Ser. No. 13/866,975, entitled "APPARATUS AND METHODS FOR REINFORCEMENT-GUIDED SUPERVISED LEARNING", filed Apr. 19, 2013, Ser. No. 13/918,338 entitled "ROBOTIC TRAINING APPARATUS AND METHODS", filed Jun. 14, 2013, Ser. No. 13/918,298 entitled "HIERARCHICAL ROBOTIC CONTROLLER APPARATUS AND METHODS", filed Jun. 14, 2013, Ser. No. 13/907,734 entitled "ADAPTIVE ROBOTIC INTERFACE APPARATUS AND METHODS", filed May 31, 2013, Ser. No. 13/842,530 entitled "ADAPTIVE PREDICTOR APPARATUS AND METHODS", filed Mar. 15, 2013, Ser. No. 13/842,562 entitled "ADAPTIVE PREDICTOR APPARATUS AND METHODS FOR ROBOTIC CONTROL", filed Mar. 15, 2013, Ser. No. 13/842,616 entitled "ROBOTIC APPARATUS AND METHODS FOR DEVELOPING A HIERARCHY OF MOTOR PRIMITIVES", filed Mar. 15, 2013, Ser. No. 13/842,647 entitled "MULTICHANNEL ROBOTIC CONTROLLER APPARATUS AND METHODS", filed Mar. 15, 2013, and Ser. No. 13/842,583 entitled "APPARATUS AND METHODS FOR TRAINING OF ROBOTIC DEVICES", filed Mar. 15, 2013, each of the foregoing being incorporated herein by reference in its entirety.

During controller training, the supervised learning process may receive supervisory input (training) from a trainer. In one or more implementations, the trainer may comprise a computerized agent and/or a human user. In some implementations of controller training by a human user, the training input may be provided by the user via a remote control apparatus e.g., such as illustrated in FIG. 2. The control apparatus 200 may be configured to provide teaching input to the adaptive controller and/or operate the robotic arm 100 via control element 214.

In the illustrated embodiment, the control element 214 comprises a slider with a single direction 218 representing one degree of freedom (DOF). A lateral or "translation" degree of freedom refers to a displacement with respect to a point of reference. A rotational degree of freedom refers to a rotation about an axis. Other common examples of control elements include e.g., joysticks, touch pads, mice, track pads, dials, etc. More complex control elements may offer even more CDOF; for example, so called 6DOF controllers may offer translation in 3 directions (forward, backward, up/down), and rotation in 3 axis (pitch, yaw, roll). The control apparatus 200 provides one or more control signals (e.g., teaching input).

In one exemplary embodiment, the one or more control signals represent a fewer number of DOF than the robot can support. For instance, with respect to FIGS. 1 and 2, the control apparatus 200 provides control signals for a single (1) CDOF, whereas the robotic arm 100 supports two (2)

CDOFs. In order to train and/or control multiple degrees of freedom of the arm 100, the control apparatus 200 may further comprise a switch element 210 configured to select the joint 102 or joint 106 the control signals should be associated with. Other common input apparatus which may be useful to specify the appropriate CDOF include, without limitation: buttons, keyboards, mice, and/or other devices.

Referring now to FIG. 3, the control apparatus 200 may be utilized to provide supervisory input to train a mobile robotic platform 300 characterized by two degrees of freedom (indicated by arrows 314, 310). The platform 300 may comprise a motorized set of wheels 312 configured to move the platform (as shown, along the direction 314). The platform 300 may also comprise a motorized turret 304 (adapted to support an antenna and/or a camera) that is configured to be rotated about the axis 310.

In the exemplary robotic devices of FIGS. 1 and 3, the supervisory signal comprises: (i) an actuator displacement value (selected by the slider 218), (ii) a selection as to the appropriate actuator mechanism (selected by the switch element 210), torque values for individual joints, and/or other. As shown in FIG. 1, the actuators control the angular displacement for the robotic limbs. In contrast in FIG. 3, the actuators control the linear displacement (via a motorized wheel drive), and a rotational displacement about the axis 310. The foregoing exemplary supervisory signal is purely illustrative and those of ordinary skill in the related arts will readily appreciate that the present disclosure contemplates supervisory signals that include e.g., multiple actuator displacement values (e.g., for multi-CDOF controller elements), multiple actuator selections, and/or other.

It is further appreciated that the illustrated examples are readily understood to translate the value from the actuator displacement value to a linear displacement, angular displacement, rotational displacement, etc. Translation may be proportional, non-proportional, linear, non-linear, etc. For example, in some variable translation schemes, the actuator displacement value may be "fine" over some ranges (e.g., allowing small precision manipulations), and much more "coarse" over other ranges (e.g., enabling large movements). While the present examples use an actuator displacement value, it is appreciated that e.g., velocity values may also be used. For example, an actuator velocity value may indicate the velocity of movement which may be useful for movement which is not bounded within a range per se. For example, with respect to FIG. 3, the motorized wheel drive and the turret rotation mechanisms may not have a limited range.

Those of ordinary skill will appreciate that actuator mechanisms vary widely based on application. Actuators may use hydraulic, pneumatic, electrical, mechanical, etc. mechanisms to generate e.g., linear force, rotational force, linear displacement, angular displacement, etc. Common examples include: pistons, comb drives, worm drives, motors, rack and pinion, chain drives, etc.

In some implementations of supervised learning by neuron networks, the training signal may comprise a supervisory signal (e.g., a spike) that triggers neuron response. Referring now to FIGS. 4-5, adaptive controllers of robotic apparatus (e.g., 100, 300 of FIGS. 1, 3) comprising a neuron network is graphically depicted.

As shown in FIG. 4, a multilayer neuron network configured to control multiple degrees of freedom (e.g., the robotic arm apparatus 100 of FIG. 1), according to one or more implementations is presented.

The multilayer network 500 of neurons is depicted within FIG. 4. The network 500 comprises: an input neuron layer (neurons 502, 504, 506), a hidden neuron layer (neurons 522, 524, 526), and an output neuron layer (neurons 542, 544). The neurons 502, 504, 506 of the input layer may receive sensory input 508 and communicate their output to the neurons 522, 524, 526 via one or more connections (512, 514, 516 in FIG. 4). In one or more implementations of sensory data processing and/or object recognition, the input layer of neurons may be referred to as non-adaptive feature extraction layer that is configured to respond to occurrence of one or more features/objects (e.g., edges, shapes, color, and or other) represented by the input 508. The neurons 522, 524, 526 of the hidden layer may communicate output (generated based on one or more inputs 512, 514, 516 and feedback signal 530) to one or more output layer neurons 542, 544 via one or more connections (532, 534, 536 in FIG. 5). In one or more implementations, the network 500 of FIG. 4 may be referred to as the two-layer network comprising two learning layers: layer of connections between the input and the hidden neuron layers (e.g., 512, 514, characterized by efficacies 518, 528), and layer of connections between the hidden and the output neuron layers (e.g., 532, 534 characterized by efficacies 548, 538). Those of ordinary skill in the related arts will readily appreciate that the foregoing network is purely illustrative and that other networks may have different connectivity; network connectivity may be e.g., one-to-one, one-to-all, all-to-one, some to some, and/or other methods.

In some instances, a network layer may provide an error feedback signal to a preceding layer. For example, as shown by arrows 530, 520 in FIG. 4, the neurons (542, 544) of the output layer provide error feedback to the neurons (522, 524, 526) of the hidden layer. T neurons (522, 524, 526) of the hidden layer provide feedback to the input layer neurons (502, 504, 506). The error propagation may be implemented using any applicable methodologies including those described in, e.g. U.S. patent application Ser. No. 13/465,903 entitled "APPARATUS AND METHODS FOR BACKWARD PROPAGATION OF ERRORS IN A SPIKING NEURON NETWORK", filed Oct. 15, 2013, incorporated herein by reference in its entirety.

The exemplary network 500 may comprise a network of spiking neurons configured to communicate with one another by means of "spikes" or electrical pulses. Additionally, as used herein, the terms "pre-synaptic" and "post-synaptic" are used to describe a neuron's relation to a connection. For example, with respect to the connection 512, the units 502 and 522 are referred to as the pre-synaptic and the post-synaptic unit, respectively. It is noteworthy, that the same unit is referred to differently with respect to different connections. For instance, unit 522 is referred to as the pre-synaptic unit with respect to the connection 532, and the post-synaptic unit with respect to the connection 512. In one or more implementations of spiking networks, the error signal 520, 530 may be propagated using spikes, e.g., as described in U.S. patent application Ser. No. 14/054,366, entitled "APPARATUS AND METHODS FOR BACKWARD PROPAGATION OF ERRORS IN A SPIKING NEURON NETWORK", filed Oct. 15, 2013, the foregoing being incorporated herein by reference in its entirety.[

The input 508 may comprise data used for solving a particular control task. For example, the signal 508 may comprise a stream of raw sensor data and/or preprocessed data. Raw sensor data may include data conveying information associated with one or more of proximity, inertial, terrain imaging, and/or other information. Preprocessed data may include data conveying information associated with one or more of velocity, information extracted from accelerometers, distance to obstacle, positions, and/or other information. In some implementations, such as those involving object recognition, the signal 508 may comprise an array of pixel values in the input image, or preprocessed data. Preprocessed data may include data conveying information associated with one or more of levels of activations of Gabor filters for face recognition, contours, and/or other information. In one or more implementations, the input signal 508 may comprise a target motion trajectory. The motion trajectory may be used to predict a future state of the robot on the basis of a current state and the target state. In one or more implementations, the signal 508 in FIG. 4 may be encoded as spikes, as described in detail in commonly owned, and co-pending U.S. patent application Ser. No. 13/842,530 entitled "ADAPTIVE PREDICTOR APPARATUS AND METHODS", filed Mar. 15, 2013, incorporated supra.

In one or more implementations, such as object recognition and/or obstacle avoidance, the input 508 may comprise a stream of pixel values associated with one or more digital images. In one or more implementations (e.g., video, radar, sonography, x-ray, magnetic resonance imaging, and/or other types of sensing), the input may comprise electromagnetic waves (e.g., visible light, IR, UV, and/or other types of electromagnetic waves) entering an imaging sensor array. In some implementations, the imaging sensor array may comprise one or more of RGCs, a charge coupled device (CCD), an active-pixel sensor (APS), and/or other sensors. The input signal may comprise a sequence of images and/or image frames. The sequence of images and/or image frame may be received from a CCD camera via a receiver apparatus and/or downloaded from a file. The image may comprise a two-dimensional matrix of RGB values refreshed at a 25 Hz frame rate. It will be appreciated by those skilled in the arts that the above image parameters are merely exemplary, and many other image representations (e.g., bitmap, CMYK, HSV, HSL, grayscale, and/or other representations) and/or frame rates are equally useful with the present technology. Pixels and/or groups of pixels associated with objects and/or features in the input frames may be encoded using, for example, latency encoding described in commonly owned and co-pending U.S. patent application Ser. No. 12/869,583, filed Aug. 26, 2010 and entitled "INVARIANT PULSE LATENCY CODING SYSTEMS AND METHODS"; U.S. Pat. No. 8,315,305, issued Nov. 20, 2012, entitled "SYSTEMS AND METHODS FOR INVARIANT PULSE LATENCY CODING"; Ser. No. 13/152,084, filed Jun. 2, 2011, entitled "APPARATUS AND METHODS FOR PULSE-CODE INVARIANT OBJECT RECOGNITION"; and/or latency encoding comprising a temporal winner take all mechanism described U.S. patent application Ser. No. 13/757,607, filed Feb. 1, 2013 and entitled "TEMPORAL WINNER TAKES ALL SPIKING NEURON NETWORK SENSORY PROCESSING APPARATUS AND METHODS", each of the foregoing being incorporated herein by reference in its entirety.

In one or more implementations, encoding may comprise adaptive adjustment of neuron parameters, such neuron excitability described in commonly owned and co-pending U.S. patent application Ser. No. 13/623,820 entitled "APPARATUS AND METHODS FOR ENCODING OF SENSORY DATA USING ARTIFICIAL SPIKING NEURONS", filed Sep. 20, 2012, the foregoing being incorporated herein by reference in its entirety.

Individual connections (e.g., 512, 532) may be assigned, inter alia, a connection efficacy, which in general may refer to a magnitude and/or probability of input into a neuron affecting neuron output. The efficacy may comprise, for example a parameter (e.g., synaptic weight) used for adaptation of one or more state variables of post-synaptic units (e.g., 530). The efficacy may comprise a latency parameter by characterizing propagation delay from a pre-synaptic unit to a post-synaptic unit. In some implementations, greater efficacy may correspond to a shorter latency. In some other implementations, the efficacy may comprise probability parameter by characterizing propagation probability from pre-synaptic unit to a post-synaptic unit; and/or a parameter characterizing an impact of a pre-synaptic spike on the state of the post-synaptic unit.

Individual neurons of the network 500 may be characterized by a neuron state. The neuron state may, for example, comprise a membrane voltage of the neuron, conductance of the membrane, and/or other parameters. The learning process of the network 500 may be characterized by one or more learning parameters, which may comprise input connection efficacy, output connection efficacy, training input connection efficacy, response generating (firing) threshold, resting potential of the neuron, and/or other parameters. In one or more implementations, some learning parameters may comprise probabilities of signal transmission between the units (e.g., neurons) of the network 500.

Referring back to FIG. 4, the training input 540 is differentiated from sensory inputs (e.g., inputs 508) as follows. During learning, input data (e.g., spike events) received at the first neuron layer via the input 508 may cause changes in the neuron state (e.g., increase neuron membrane potential and/or other parameters). Changes in the neuron state may cause the neuron to generate a response (e.g., output a spike). The training input 540 (also "teaching data") causes (i) changes in the neuron dynamic model (e.g., modification of parameters a,b,c,d of Izhikevich neuron model, described for example in commonly owned and co-pending U.S. patent application Ser. No. 13/623,842, entitled "SPIKING NEURON NETWORK ADAPTIVE CONTROL APPARATUS AND METHODS", filed Sep. 20, 2012, incorporated herein by reference in its entirety), and/or (ii) modification of connection efficacy, based, for example, on the timing of input spikes, teaching spikes, and/or output spikes. In some implementations, the teaching data may trigger neuron output in order to facilitate learning. In some implementations, the teaching data may be communicated to other components of the control system.

During normal operation (e.g., subsequent to learning), data 508 arriving to neurons of the network may cause changes in the neuron state (e.g., increase neuron membrane potential and/or other parameters). Changes in the neuron state may cause the neuron to generate a response (e.g., output a spike). However, during normal operation, the training input 540 is absent; the input data 508 is required for the neuron to generate output.

In some implementations, one of the outputs (e.g., generated by neuron 542) may be configured to actuate the first CDOF of the robotic arm 100 (e.g., joint 102); another output (e.g., generated by neuron 542) may be configured to actuate the second CDOF of the robotic arm 100 (e.g., the joint 106).

While FIG. 4 illustrates a multilayer neuron network having three layers of neurons, it will be appreciated by those of ordinary skill in the related arts that any number of layers of neurons are contemplated by the present disclosure. Complex systems may require more neuron layers whereas simpler systems may utilize fewer layers. In other cases, implementation may be driven by other cost/benefit analysis. For example, power consumption, system complexity, number of inputs, number of outputs, the presence (or lack of) existing technologies, etc. may affect the multilayer neuron network implementation.

Figure 5:
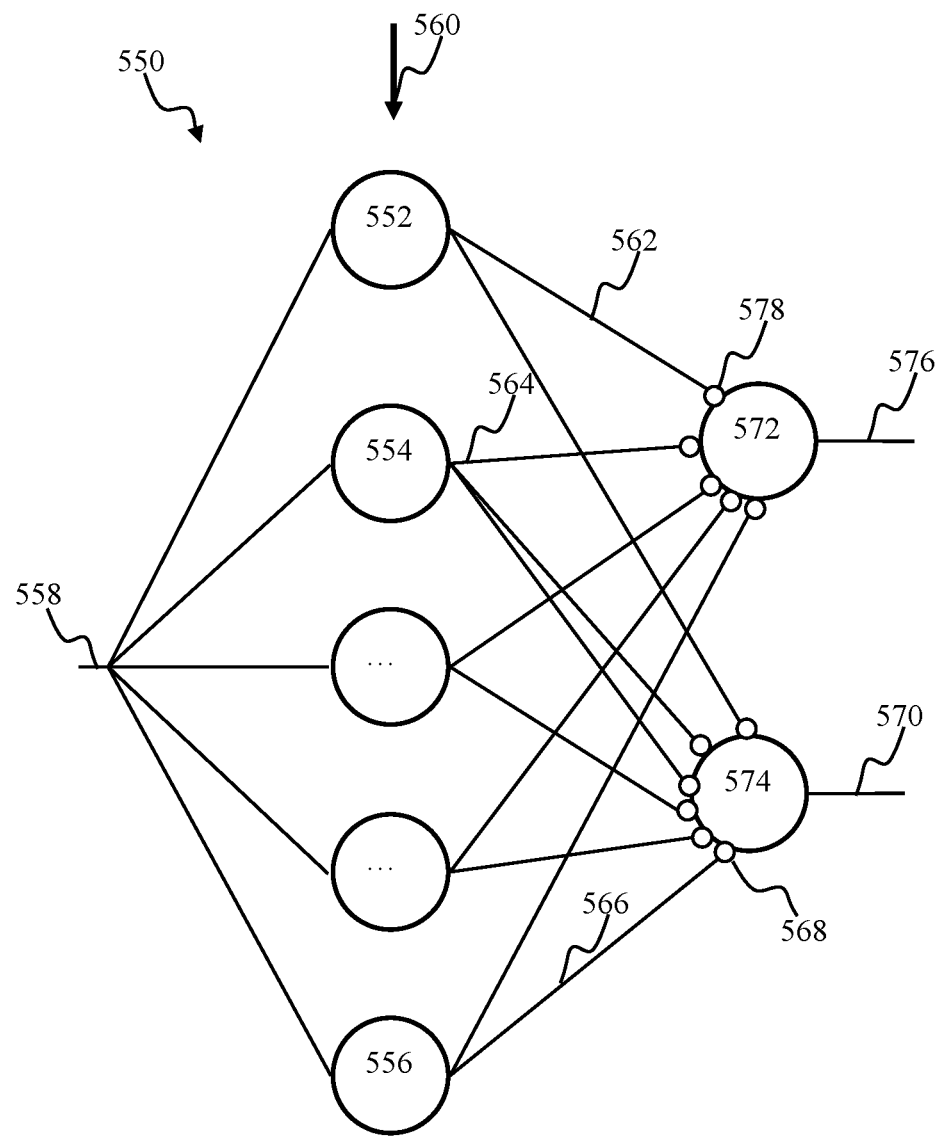
FIG. 5 is a graphical illustration depicting a single layer neuron network configured to operate multiple degrees of freedom of, e.g., a robotic apparatus of FIG. 1, according to one or more implementations.

FIG. 5 depicts an exemplary neuron network 550 for controlling multiple degrees of freedom (e.g., the robotic arm apparatus 100 of FIG. 1), according to one or more implementations is presented.

The network 550 of FIG. 5 may comprise two layers of neurons. The first layer (also referred to as the input layer) may comprise multiple neurons (e.g., 552, 554, 556). The second layer (also referred to as the output layer) may comprise two neurons (572, 574). The input layer neurons (e.g., 552, 554, 556) receive sensory input 558 and communicate their output to the output layer neurons (572, 574) via one or more connections (e.g., 562, 564, 566 in FIG. 5). In one or more implementations, the network 550 of FIG. 5 may be referred to as the single-layer network comprising one learning layer of connections (e.g., 562, 566 characterized by efficacies e.g., 578, 568).

In sensory data processing and/or object recognition implementations, the first neuron layer (e.g., 552, 554, 556) may be referred to as non-adaptive feature extraction layer configured to respond to occurrence of one or more features/objects (e.g., edges, shapes, color, and or other) in the input 558. The second layer neurons (572, 574) generate control output 576, 570 based on one or more inputs received from the first neuron layer (e.g., 562, 564, 566) to a respective actuator (e.g., the joints 102, 106 in FIG. 1). Those of ordinary skill in the related arts will readily appreciate that the foregoing network is purely illustrative and that other networks may have different connectivity; network connectivity may be e.g., one-to-one, one-to-all, all-to-one, some to some, and/or other methods.

The network 500 and/or 550 of FIGS. 4-5 may be operable in accordance with a supervised learning process configured based on teaching signal 540, 560, respectively. In one or more implementations, the network 500, 550 may be configured to optimize performance (e.g., performance of the robotic apparatus 100 of FIG. 1) by minimizing the average value of a performance function e.g., as described in detail in commonly owned and co-pending U.S. patent application Ser. No. 13/487,499, entitled "STOCHASTIC APPARATUS AND METHODS FOR IMPLEMENTING GENERALIZED LEARNING RULES", incorporated herein by reference in its entirety. It will be appreciated by those skilled in the arts that supervised learning methodologies may be used for training artificial neural networks, including but not limited to, an error back propagation, described in, e.g. U.S. patent application Ser. No. 13/465,903 entitled "APPARATUS AND METHODS FOR BACKWARD PROPAGATION OF ERRORS IN A SPIKING NEURON NETWORK", filed Oct. 15, 2013, incorporated supra, naive and semi-naïve Bayes classifier, described in, e.g. U.S. patent application Ser. No. 13/756,372 entitled "SPIKING NEURON CLASSIFIER APPARATUS AND METHODS", filed Jan. 31, 2013, the foregoing being incorporated herein by reference in its entirety, and/or other approaches, such as ensembles of classifiers, random forests, support vector machine, Gaussian processes, decision tree learning, boosting (using a set of classifiers with a low correlation to the true classification), and/or other. During learning, the efficacy (e.g., 518, 528, 538, 548 in FIG. 4 and 568, 578 in FIG. 5) of connections of the network may be adapted in accordance with one or more adaptation rules. The rules may be configured to implement synaptic plasticity in the network. In some implementations, the synaptic plastic rules may comprise one or more spike-timing dependent plasticity rules, such as rules comprising feedback described in commonly owned and co-pending U.S. patent application Ser. No. 13/465,903 entitled "SENSORY INPUT PROCESSING APPARATUS IN A SPIKING NEURAL NETWORK", filed May 7, 2012; rules configured to modify of feed forward plasticity due to activity of neighboring neurons, described in co-owned U.S. patent application Ser. No. 13/488,106, entitled "SPIKING NEURON NETWORK APPARATUS AND METHODS", filed Jun. 4, 2012; conditional plasticity rules described in U.S. patent application Ser. No. 13/541,531, entitled "CONDITIONAL PLASTICITY SPIKING NEURON NETWORK APPARATUS AND METHODS", filed Jul. 3, 2012; plasticity configured to stabilize neuron response rate as described in U.S. patent application Ser. No. 13/691,554, entitled "RATE STABILIZATION THROUGH PLASTICITY IN SPIKING NEURON NETWORK", filed Nov. 30, 2012; activity-based plasticity rules described in co-owned U.S. patent application Ser. No. 13/660,967, entitled "APPARATUS AND METHODS FOR ACTIVITY-BASED PLASTICITY IN A SPIKING NEURON NETWORK", filed Oct. 25, 2012, U.S. patent application Ser. No. 13/660,945, entitled "MODULATED PLASTICITY APPARATUS AND METHODS FOR SPIKING NEURON NETWORKS", filed Oct. 25, 2012; and U.S. patent application Ser. No. 13/774,934, entitled "APPARATUS AND METHODS FOR RATE-MODULATED PLASTICITY IN A SPIKING NEURON NETWORK", filed Feb. 22, 2013; multi-modal rules described in U.S. patent application Ser. No. 13/763,005, entitled "SPIKING NETWORK APPARATUS AND METHOD WITH BIMODAL SPIKE-TIMING DEPENDENT PLASTICITY", filed Feb. 8, 2013, each of the foregoing being incorporated herein by reference in its entirety.

In one or more implementations, neuron operation may be configured based on one or more inhibitory connections providing input configured to delay and/or depress response generation by the neuron, as described in commonly owned and co-pending U.S. patent application Ser. No. 13/660,923, entitled "ADAPTIVE PLASTICITY APPARATUS AND METHODS FOR SPIKING NEURON NETWORK", filed Oct. 25, 2012, the foregoing being incorporated herein by reference in its entirety.

Connection efficacy updated may be effectuated using a variety of applicable methodologies such as, for example, event-based updates described in detail in commonly owned and co-pending U.S. patent application Ser. No. 13/239,255 filed Sep. 21, 2011, entitled "APPARATUS AND METHODS FOR SYNAPTIC UPDATE IN A PULSE-CODED NETWORK", Ser. No. 13/588,774, entitled "APPARATUS AND METHODS FOR IMPLEMENTING EVENT-BASED UPDATES IN SPIKING NEURON NETWORK", filed Aug. 17, 2012; and Ser. No. 13/560,891 entitled "APPARATUS AND METHODS FOR EFFICIENT UPDATES IN SPIKING NEURON NETWORKS", each of the foregoing being incorporated herein by reference in its entirety.

A neuron process may comprise one or more learning rules configured to adjust neuron state and/or generate neuron output in accordance with neuron inputs. In some implementations, the one or more learning rules may comprise state dependent learning rules described, for example, in commonly owned and co-pending U.S. patent application Ser. No. 13/560,902, entitled "APPARATUS AND METHODS FOR STATE-DEPENDENT LEARNING IN SPIKING NEURON NETWORKS", filed Jul. 27, 2012 and/or U.S. patent application Ser. No. 13/722,769 filed Dec. 20, 2012, and entitled "APPARATUS AND METHODS FOR STATE-DEPENDENT LEARNING IN SPIKING NEURON NETWORKS", each of the foregoing being incorporated herein by reference in its entirety.

In some implementations, the single-layer network 550 of FIG. 5 may be embodied in an adaptive controller configured to operate a robotic platform characterized by multiple degrees of freedom (e.g., the robotic arm 100 of FIG. 1 with two CDOF). By way of an illustration, the network 550 outputs 570, 576 of FIG. 5 may, be configured to operate the joints 102, 106, respectively, of the robotic arm in FIG. 1. During a first plurality of trials, the network 550 may trained to operate a first subset of the robot's available CDOF (e.g., the joint 102 in FIG. 1). Efficacy of the connections communicating signals from the first layer of the network 550 (e.g., the neurons 552, 554, 556) to the second layer neurons (e.g., efficacy 568 of the connection 566 communicating data to the neuron 574 in FIG. 5) may be adapted in accordance with a learning method.

Similarly, during a second plurality of trials, the network 550 may trained to operate a second subset of the robot's available CDOF (e.g., the joint 106 in FIG. 1). Efficacy of the connections communicating signal from the first layer of the network 550 (e.g., the neurons 552, 554, 556) to the second layer neurons (e.g., efficacy 578 of the connection 562 communicating data to the neuron 572 in FIG. 5) may be adapted in accordance with the learning method.

By employing time multiplexed learning of multiple CDOF operations, learning speed and/or accuracy may be improved, compared to a combined learning approach where all of the robot's available CDOFs are being trained contemporaneously. It is noteworthy, that the two-layer network architecture (e.g., of the network 550 in FIG. 5) may enable separate adaptation of efficacy for individual network outputs. That is, efficacy of connections into the neuron 572 (obtained when training the neuron 572 to operate the joint 102) may be left unchanged when training the neuron 574 to operate the joint 106.

In some implementations, the multi-layer network 500 of FIG. 4 may be embodied in an adaptive controller configured to operate a robotic platform characterized by multiple degrees of freedom (e.g., the robotic arm 100 of FIG. 1 with two CDOF). By way of illustration, the network 500 outputs 546, 547 of FIG. 4 may be configured to operate the joints 102, 106, respectively, of the arm in FIG. 1. During a first plurality of trials, the network 500 may trained to operate a first subset of the robot's available CDOF (e.g., the joint 102 in FIG. 1). Efficacy of connections communicating signal from the first layer of the network 500 (e.g., the neurons 502, 504, 506) to the second layer neurons (e.g., efficacy 518, 528 of connections 514, 512 communicating data to neurons 526, 522 in FIG. 4) may be adapted in accordance with a learning method. Efficacy of connections communicating signal from the second layer of the network 500 (e.g., the neurons 522, 524, 526) to the second layer output neuron (e.g., efficacy 548 of connections 532 communicating data to the neuron 542 in FIG. 4) may be adapted in accordance with the learning method.

During a second plurality of trials, the network 500 may trained to operate a second subset of the robot's available CDOF (e.g., the joint 106 in FIG. 1). During individual trials of the second plurality of trials efficacy of connections communicating signal from the second layer of the network 500 (e.g., the neurons 522, 524, 526) to the second layer output neuron (e.g., efficacy 538 of connections 534 communicating data to the neuron 544 in FIG. 4) may be adapted in accordance with the learning method. In some embodiments, the efficacy of connections communicating signal from the first layer of the network to the second layer neurons determined during the first plurality of trials may be further adapted or refined during the second plurality of trials in accordance with the learning method, using, e.g., optimization methods based on a cost/reward function. The cost/reward function may be configured the user and/or determined by the adaptive system during the first learning stage.

Figure 6:
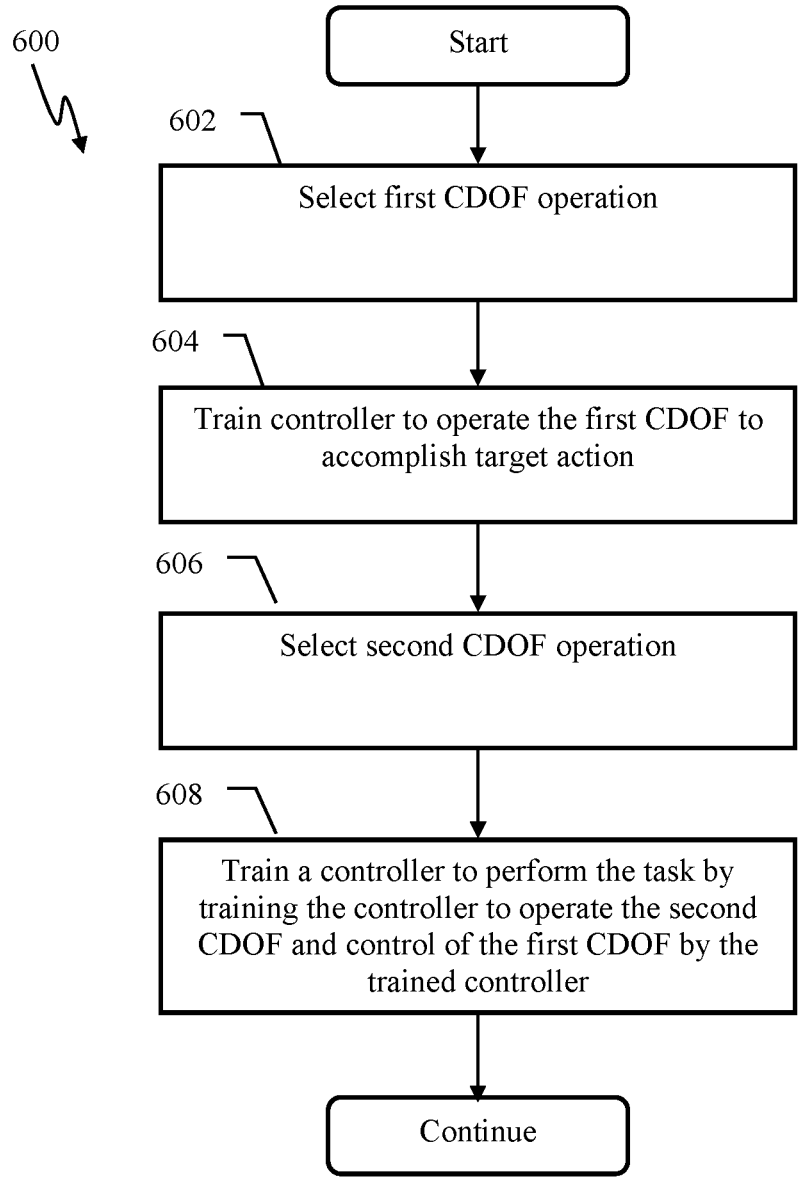
FIG. 6 is a logical flow diagram illustrating a method of operating an adaptive robotic device, in accordance with one or more implementations.
Figure 7:
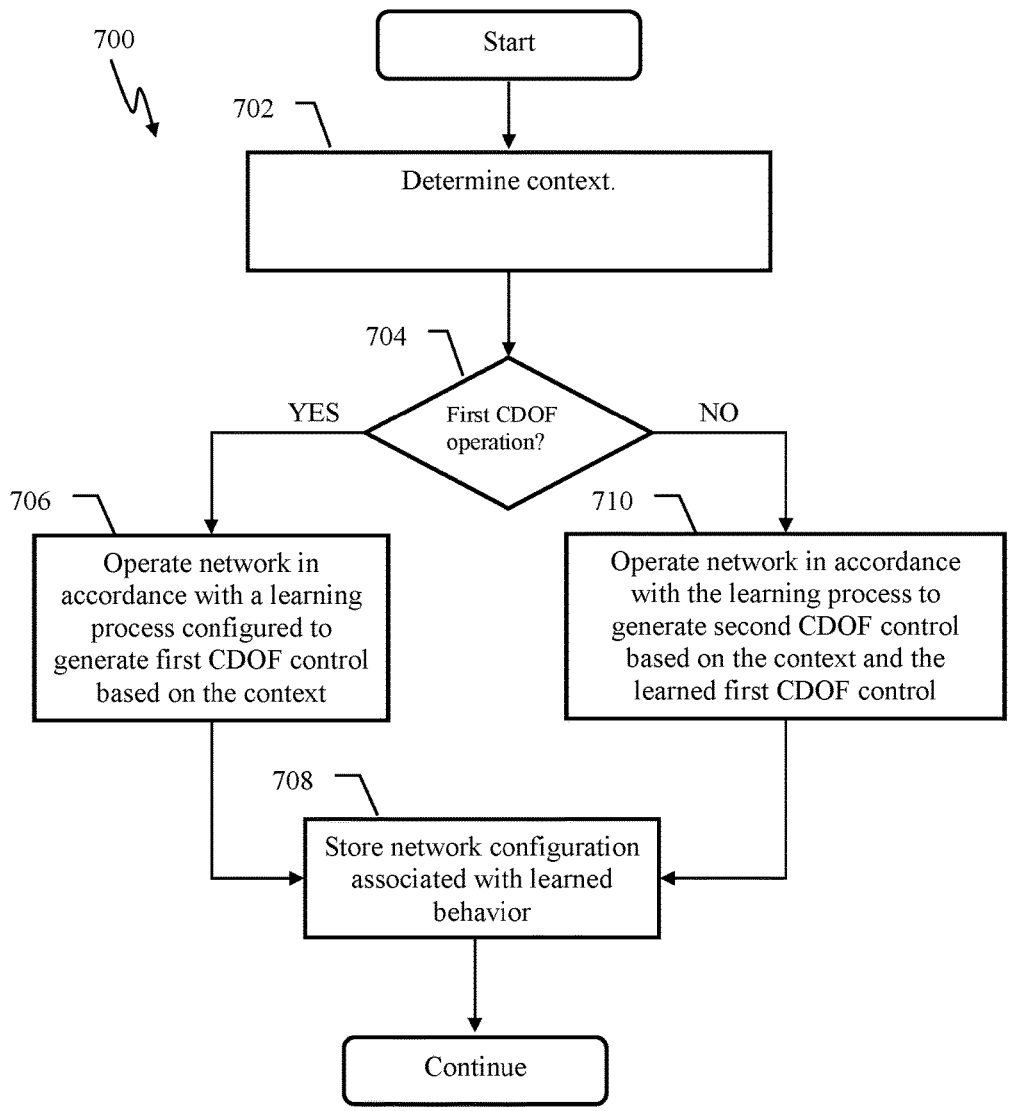
FIG. 7 is a logical flow diagram illustrating a method of training an adaptive controller of a robot using a reduced degree of freedom methodology, in accordance with one or more implementations.
Figure 8:
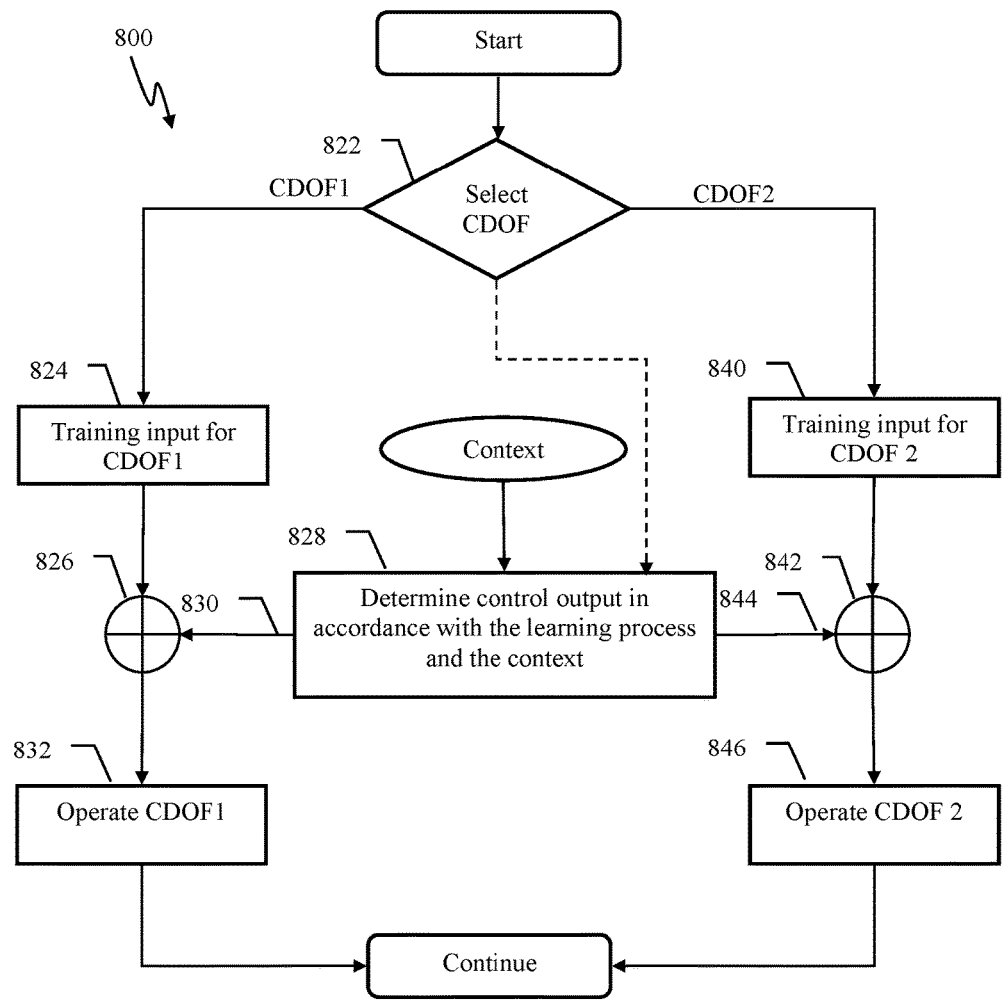
FIG. 8 is a logical flow diagram illustrating a method of training an adaptive controller apparatus to control a robot using a reduced degree of freedom methodology, in accordance with one or more implementations.

FIGS. 6-8 illustrate methods of training an adaptive apparatus of the disclosure in accordance with one or more implementations. In some implementations, methods 600, 700, 800 may be accomplished with one or more additional operations not described, and/or without one or more of the operations discussed. Additionally, the order in which the operations of methods 600, 700, 800 are illustrated in FIGS. 6-8 described below is not limiting, the various steps may be performed in other orders, etc. Similarly, various steps of the methods 600, 700, 800 may be substituted for equivalent or substantially equivalent steps. The methods 600, 700, 800 presented below are illustrative, any and all of the modifications described herein are readily performed by those of ordinary skill in the related arts.

In some implementations, methods 600, 700, 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 600, 700, 800 in response to instructions stored electronically on an electronic storage medium. The one or more processing devices may include one or more devices configured through hardware, firmware, and/or software to be specifically designed for execution of one or more of the operations of methods 600, 700, 800. Operations of methods 600, 700, 800 may be utilized with a robotic apparatus (see e.g., the robotic arm 100 of FIG. 1 and the mobile robotic platform 300 of FIG. 3) using a remote control robotic apparatus (such as is illustrated in FIG. 2).

FIG. 6 is a logical flow diagram illustrating a generalized method for operating an adaptive robotic device, in accordance with one or more implementations.

At operation 602 of method 600, a first actuator associated with a first CDOF operation of a robotic device is selected. In one embodiment, the CDOF selection may be effectuated by issuing an instruction to the robotic control apparatus (e.g., pressing a button, issuing a voice command, an audible signal (e.g., a click), an initialization after power-on/reset sequence, a pre-defined programming sequence, etc.). In other embodiments, the CDOF selection may be effectuated based on a timer event, and/or training performance reaching a target level, e.g., determined based on ability of the trainer to position of one of the joints within a range from a target position. For example, in the context of FIG. 1, in one exemplary embodiment, the first CDOF selection comprises selecting joint 102 of the robotic arm 100.

At operation 604, the adaptive controller is trained to actuate movement in the first CDOF of the robot to accomplish a target action. In some implementations, the nature of the task is too complex to be handled with a single CDOF and thus require multiple CDOFs.

Operation 604 may comprise training a neuron network (such as e.g., 500, 550 of FIGS. 4-5) in accordance with a supervised learning method. In one or more implementations, the adaptive controller may comprise one or more predictors, training may be based on a cooperation between the trainer and the controller, e.g., as described in commonly owned and co-pending U.S. patent application Ser. No. 13/953,595 entitled "APPARATUS AND METHODS FOR TRAINING AND CONTROL OF ROBOTIC DEVICES", filed Jul. 29, 2013, each of the foregoing being incorporated herein by reference in its entirety and/or U.S. patent application Ser. No. 13/918,338 entitled "ROBOTIC TRAINING APPARATUS AND METHODS", filed Jun. 14, 2013, incorporated supra. During training, the trainer may provide control commands (such as the supervisory signals 540, 560 in the implementations of FIGS. 4-5). Training input may be combined with the predicted output.

At operation 606, a second actuator associated with a second CDOF operation of the robotic device is selected. The CDOF selection may be effectuated by issuing an instruction to the robotic control apparatus (e.g., pressing the button 210, issuing a voice command, and/or using another communication method). For example, in the context of FIG. 1, the second CDOF selection may comprise selecting the other joint 106 of the robotic arm.

At operation 608, the adaptive controller may be trained to operate the second CDOF of the robot in order to accomplish the target action. In some implementations, the operation 608 may comprise training a neuron network (such as e.g., 500, 550 of FIGS. 4-5) in accordance with a supervised learning method. In one or more implementations, the adaptive controller may be configured to operate the first CDOF of the robot based on outcome of the training during operation 608. The trainer may initially operate the second CDOF of the robot. Training based on cooperation between the trainer and the controller, e.g., as described above with respect to operation 608, may enable knowledge transfer from the trainer to the controller so as to enable the controller to operate the robot using the first and the second CDOFs. During controller training of operations 604, 608, the trainer may utilize a remote interface (e.g., the control apparatus 200 of FIG. 2) in order to provide teaching input for the first and the second CDOF training trials.

It is appreciated that the method 600 may be used with any number of degrees of freedom, additional degrees being iteratively implemented. For example, for a device with six (6) degrees of freedom, training may be performed with six independent iterations, where individual iteration may be configured to train one (1) degree of freedom. Moreover, more complex controllers may further reduce iterations by training multiple simultaneous degrees of freedom; e.g., three (3) iterations of a controller with two (2) degrees of freedom, two (2) iterations of a controller with three (3) degrees of freedom, etc.

Still further it is appreciated that the robotic apparatus may support a number of degrees of freedom which is not evenly divisible by the degrees of freedom of the controller. For example, a robotic mechanism that supports five (5) degrees of freedom can be trained in two (2) iterations with a controller that supports three (3) degrees of freedom.

FIG. 7 illustrates a method of training an adaptive controller of a robotic apparatus using the reduced degree of freedom methodology described herein, in accordance with one or more implementations. In one or more implementations, the adaptive controller may comprise a neuron network operable in accordance with a supervised learning process (e.g., the network 500, 550 of FIGS. 4-5, described supra.).

At operation 702 of method 700, a context is determined. In some implementations, the context may be determined based on one or more sensory input and/or feedback that may be provided by the robotic apparatus to the controller. In some implementations, the sensory aspects may include an object being detected in the input, a location of the object, an object characteristic (color/shape), a sequence of movements (e.g., a turn), a characteristic of an environment (e.g., an apparent motion of a wall and/or other surroundings turning and/or approaching) responsive to the movement. In some implementations, the sensory input may be received during one or more training trials of the robotic apparatus.

At operation 704, a first or a second actuator associated with a first or second CDOF of the robotic apparatus is selected for operation. For example, the first and the second CDOF may correspond to operation of the motorized joints 102, 106, respectively, of the manipulator arm 100 in FIG. 1.

Responsive to selecting the first actuator of the robotic apparatus, the method may proceed to operation 706, wherein the neuron network of the adaptive controller may be operated in accordance with the learning process to generate the first CDOF control output based on the context (e.g., learn a behavior associated with the context). In some implementations, the teaching signal for the first CDOF may comprise (i) a signal provided by the user via a remote controller, (ii) a signal provided by the adaptive system for the controlled CDOF, and/or (iii) a weighted combination of the above (e.g., using constant and/or adjustable weights).

Responsive to selecting the second actuator of the robotic apparatus, the method may proceed to operation 710 wherein the neuron network of the adaptive controller is operated in accordance with the learning process configured to generate the second CDOF control output based on the context (e.g., learn a behavior associated with the context).

At operation 708, network configuration associated with the learned behavior at operation 704 and/or 710 may be stored. In one or more implementations, the network configuration may comprise efficacy of one or more connections of the network (e.g., weights) that may have been adapted during training.

FIG. 8 illustrates a method of training an adaptive apparatus to control a robot using a reduced degree of freedom methodology, in accordance with one or more implementations. The robot may be characterized by two or more degrees of freedom; the adaptive controller apparatus may be configured to control a selectable subset of the CDOF of the robot during a trial.

At operation 822 of method 800, an actuator associated with a CDOF is selected for training. In one or more implementations, the CDOF selection may be effectuated by issuing an instruction to the robotic control apparatus (e.g., pressing a button, issuing an audible signal (e.g., a click, and/or a voice command), and/or using another communication method). In one or more implementations, the CDOF selection may be effectuated based on a timer event, and/or training performance reaching a target level. For example, upon learning to position/move one joint to a target location, the controller may automatically switch to training of another joint.

Responsive to selection of a first actuator associated with a first CDOF of the robotic apparatus, the method proceeds to operation 824, where training input for the first CDOF (CDOF1) is provided. For example, in the context of the robotic arm 100 of FIG. 1, the first CDOF training comprises training the joint 106. The training input may include one or more motor commands and/or action indications communicated using the remote control apparatus 200 of FIG. 2.

At operation 828, the control output may be determined in accordance with the learning process and context. In some implementations, the context may comprise the input into the adaptive controller e.g., as described above with respect to operation 702 of method 700.

The control output determined at operation 828 may comprise the first CDOF control instructions 830 and/or the second CDOF control instructions 844. The learning process may be implemented using an iterative approach wherein control of one CDOF may be learned partly before switching to learning another CDOF. Such back and forth switching may be employed until the target performance is attained.

Referring now to operation 826, the control CDOF 1 output 830 may be combined with the first CDOF training input provided at operation 824. The combination of operation 826 may be configured based on a transfer function. In one or more implementations, the transfer function may comprise addition, union, a logical 'AND' operation, and/or other operations e.g., as described in commonly owned and co-pending U.S. patent application Ser. No. 13/842,530 entitled "ADAPTIVE PREDICTOR APPARATUS AND METHODS", filed Mar. 15, 2013, incorporated supra.

At operation 832, the first actuator associated with the first CDOF (CDOF1) of the robotic device is operated in accordance with the control output determined at operation 826. Within the context of the robotic arm 100 of FIG. 1, the actuator for joint 102 is operated based on a combination of the teaching input provided by a trainer and a predicted control signal determined by the adaptive controller during learning and in accordance with the context.

Responsive to selection of a second actuator associated with a second CDOF of the robotic apparatus, the method proceeds to operation 840, where training input for the second CDOF (CDOF2) is provided. For example, in the context of the robotic arm 100 of FIG. 1, the second CDOF training comprises training the joint 102. The training input includes one or more motor commands and/or action indications communicated using the remote control apparatus 200 of FIG. 2.

Referring now to operation 842, the control CDOF 2 output 844 may be combined with the second CDOF training input provided at operation 840. The combination of operation 842 may be configured based on a transfer function. In one or more implementations, the transfer function may comprise addition, union, a logical 'AND' operation, and/or other operations e.g., as described in commonly owned and co-pending U.S. patent application Ser. No. 13/842,530 entitled "ADAPTIVE PREDICTOR APPARATUS AND METHODS", filed Mar. 15, 2013, incorporated supra.

At operation 846, the second actuator associated with the second CDOF (CDOF2) of the robotic device is operated in accordance with the control output determined at operation 842. Within the context of the robotic arm 100 of FIG. 1, the actuator for joint 106 is operated based on a combination of the teaching input provided by a trainer and a predicted control signal determined by the adaptive controller during learning and in accordance with the context. In some implementations, the CDOF 1 may be operated contemporaneously with the operation of the CDOF 2 based on the output 830 determined during prior training trials.

Various exemplary computerized apparatus configured to implement learning methodology set forth herein are now described with respect to FIGS. 9A-9D.

Figure 9A:
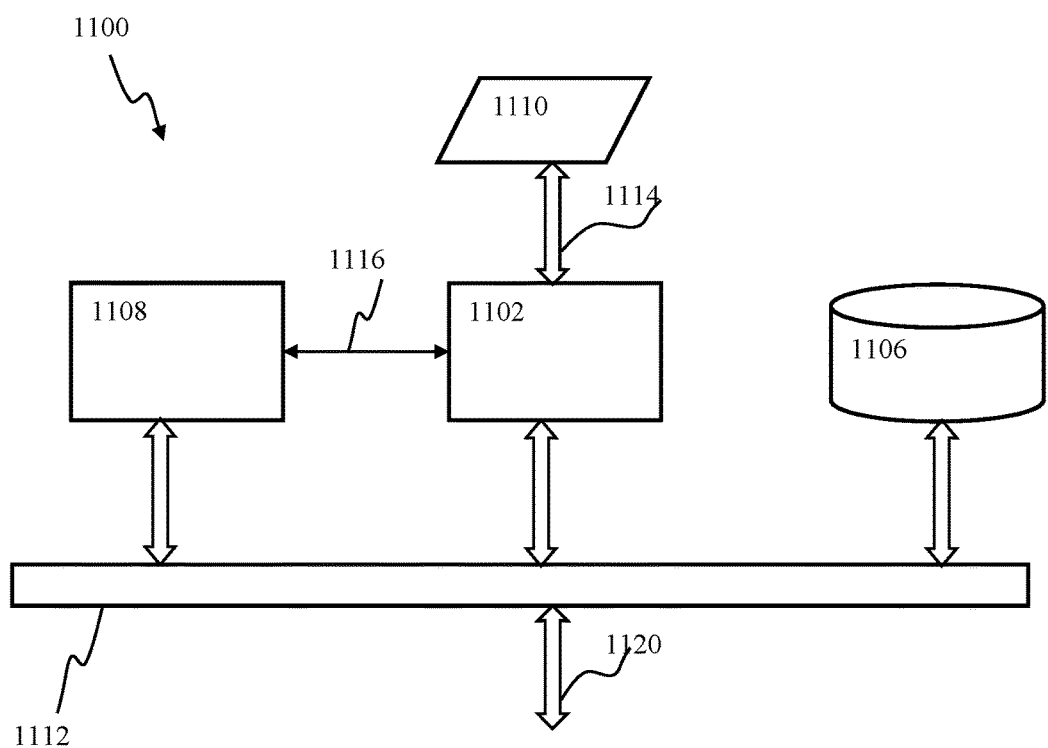
FIG. 9A is a block diagram illustrating a computerized system useful for, inter alia, operating a parallel network configured using reduced degree of freedom training methodology, in accordance with one or more implementations.

A computerized neuromorphic processing system, consistent with one or more implementations, for use with an adaptive robotic controller described, supra, is illustrated in FIG. 9A. The computerized system 1100 of FIG. 9A may comprise an input device 1110, such as, for example, an image sensor and/or digital image interface. The input interface 1110 may be coupled to the processing block (e.g., a single or multi-processor block) via the input communication interface 1114. In some implementations, the interface 1114 may comprise a wireless interface (cellular wireless, Wi-Fi, Bluetooth, etc.) that enables data transfer to the processor 1102 from remote I/O interface 1100, e.g. One such implementation may comprise a central processing apparatus coupled to one or more remote camera devices providing sensory input to the pre-processing block.

The system 1100 further may comprise a random access memory (RAM) 1108, configured to store neuronal states and connection parameters and to facilitate synaptic updates. In some implementations, synaptic updates may be performed according to the description provided in, for example, in commonly owned and co-pending U.S. patent application Ser. No. 13/239,255 filed Sep. 21, 2011, entitled "APPARATUS AND METHODS FOR SYNAPTIC UPDATE IN A PULSE-CODED NETWORK", incorporated by reference, supra.

In some implementations, the memory 1108 may be coupled to the processor 1102 via a direct connection 1116 (e.g., memory bus). The memory 1108 may also be coupled to the processor 1102 via a high-speed processor bus 1112.

The system 1100 may comprise a nonvolatile storage device 1106. The nonvolatile storage device 1106 may comprise, inter alia, computer readable instructions configured to implement various aspects of spiking neuronal network operation. Examples of various aspects of spiking neuronal network operation may include one or more of sensory input encoding, connection plasticity, operation model of neurons, learning rule evaluation, other operations, and/or other aspects. In one or more implementations, the nonvolatile storage 1106 may be used to store state information of the neurons and connections for later use and loading previously stored network configuration. The nonvolatile storage 1106 may be used to store state information of the neurons and connections when, for example, saving and/or loading network state snapshot, implementing context switching, saving current network configuration, and/or performing other operations. The current network configuration may include one or more of connection weights, update rules, neuronal states, learning rules, and/or other parameters.

In some implementations, the computerized apparatus 1100 may be coupled to one or more of an external processing device, a storage device, an input device, and/or other devices via an I/O interface 1120. The I/O interface 1120 may include one or more of a computer I/O bus (PCI-E), wired (e.g., Ethernet) or wireless (e.g., Wi-Fi) network connection, and/or other I/O interfaces.

In some implementations, the input/output (I/O) interface may comprise a speech input (e.g., a microphone) and a speech recognition module configured to receive and recognize user commands.

It will be appreciated by those skilled in the arts that various processing devices may be used with computerized system 1100, including but not limited to, a single core/multicore CPU, DSP, FPGA, GPU, ASIC, combinations thereof, and/or other processing entities (e.g., computing clusters and/or cloud computing services). Various user input/output interfaces may be similarly applicable to implementations of the disclosure including, for example, an LCD/LED monitor, touch-screen input and display device, speech input device, stylus, light pen, trackball, and/or other devices.

Figure 9B:
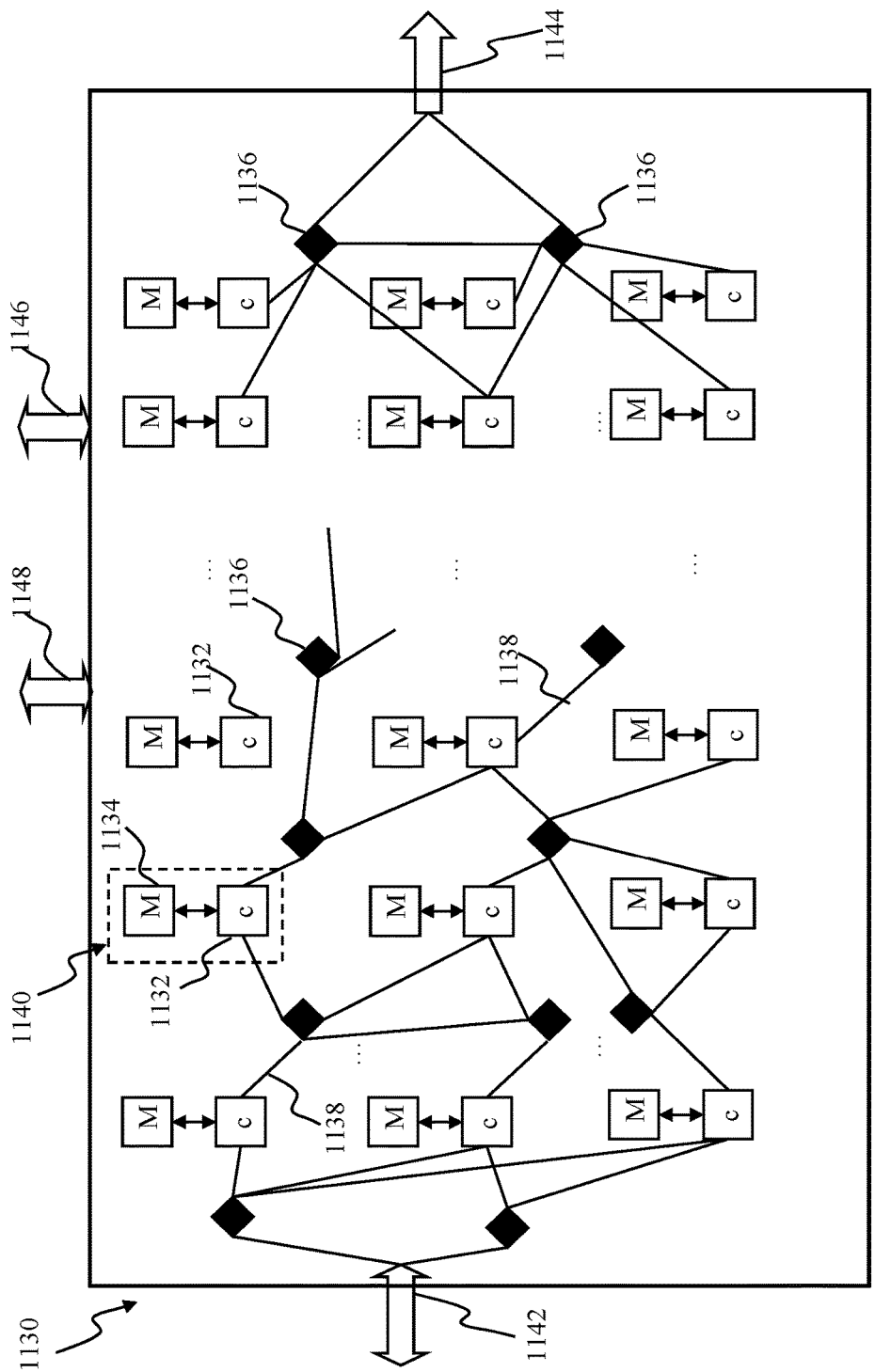
FIG. 9B is a block diagram illustrating a cell-type neuromorphic computerized system useful with, inter alia, reduced degree of freedom methodology of the disclosure, in accordance with one or more implementations.

Referring now to FIG. 9B, one implementation of neuromorphic computerized system configured to implement classification mechanism using a neuron network is described in detail. The neuromorphic processing system 1130 of FIG. 9B may comprise a plurality of processing blocks (micro-blocks) 1140. Individual micro cores may comprise a computing logic core 1132 and a memory block 1134. The logic core 1132 may be configured to implement various aspects of neuronal node operation, such as the node model, and synaptic update rules and/or other tasks relevant to network operation. The memory block may be configured to store, inter alia, neuronal state variables and connection parameters (e.g., weights, delays, I/O mapping) of connections 1138.

The micro-blocks 1140 may be interconnected with one another using connections 1138 and routers 1136. As it is appreciated by those skilled in the arts, the connection layout in FIG. 9B is exemplary, and many other connection implementations (e.g., one to all, all to all, and/or other maps) are compatible with the disclosure.

The neuromorphic apparatus 1130 may be configured to receive input (e.g., visual input) via the interface 1142. In one or more implementations, applicable for example to interfacing with computerized spiking retina, or image array, the apparatus 1130 may provide feedback information via the interface 1142 to facilitate encoding of the input signal.

The neuromorphic apparatus 1130 may be configured to provide output via the interface 1144. Examples of such output may include one or more of an indication of recognized object or a feature, a motor command (e.g., to zoom/pan the image array), and/or other outputs.

The apparatus 1130, in one or more implementations, may interface to external fast response memory (e.g., RAM) via high bandwidth memory interface 1148, thereby enabling storage of intermediate network operational parameters. Examples of intermediate network operational parameters may include one or more of spike timing, neuron state, and/or other parameters. The apparatus 1130 may interface to external memory via lower bandwidth memory interface 1146 to facilitate one or more of program loading, operational mode changes, retargeting, and/or other operations. Network node and connection information for a current task may be saved for future use and flushed. Previously stored network configuration may be loaded in place of the network node and connection information for the current task, as described for example in commonly owned and co-pending U.S. patent application Ser. No. 13/487,576 entitled "DYNAMICALLY RECONFIGURABLE STOCHASTIC LEARNING APPARATUS AND METHODS", filed Jun. 4, 2012, incorporated herein by reference in its entirety. External memory may include one or more of a Flash drive, a magnetic drive, and/or other external memory.

Figure 9C:
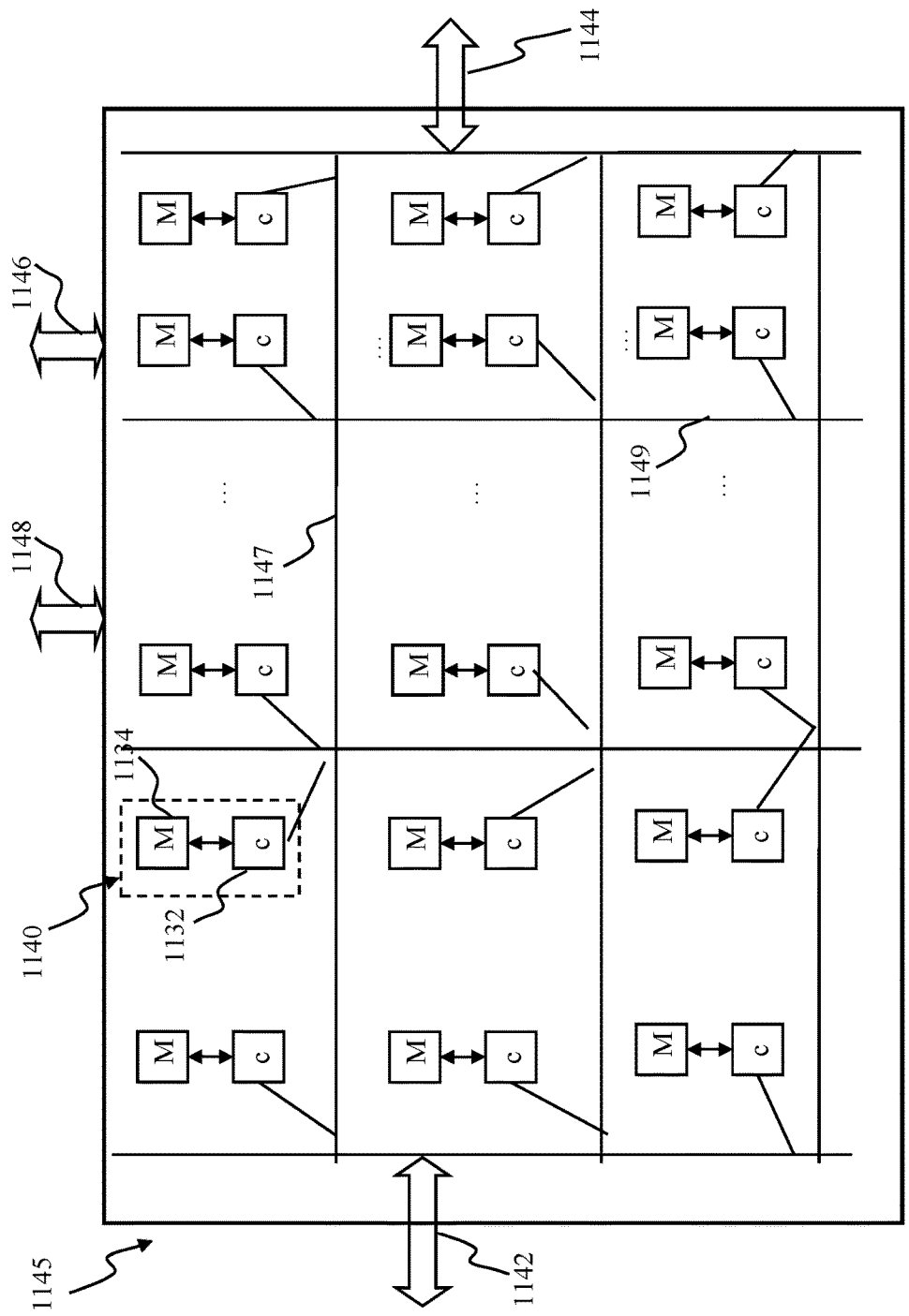
FIG. 9C is a block diagram illustrating a hierarchical neuromorphic computerized system architecture useful with, inter alia, reduced degree of freedom training methodology, in accordance with one or more implementations.

FIG. 9C illustrates one or more implementations of shared bus neuromorphic computerized system 1145 comprising micro-blocks 1140, described with respect to FIG. 9B, supra. The system 1145 of FIG. 9C may utilize shared bus 1147, 1149 to interconnect micro-blocks 1140 with one another.

Figure 9D:
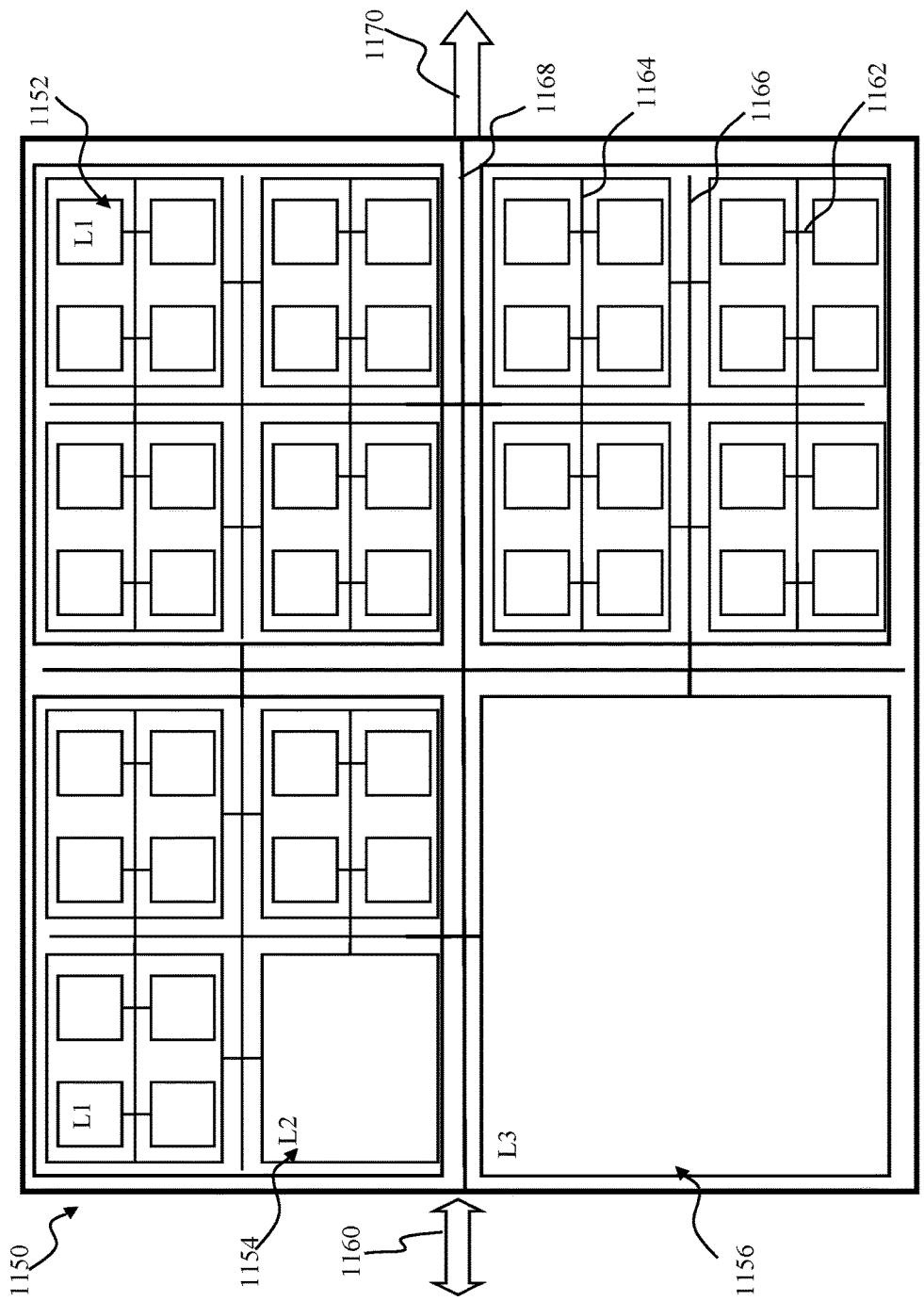
FIG. 9D is a block diagram illustrating cell-type neuromorphic computerized system architecture useful with, inter alia, reduced degree of freedom training methodology, in accordance with one or more implementations.

FIG. 9D illustrates one implementation of cell-based neuromorphic computerized system architecture configured to optical flow encoding mechanism in a spiking network is described in detail. The neuromorphic system 1150 may comprise a hierarchy of processing blocks (cells blocks). In some implementations, the lowest level L1 cell 1152 of the apparatus 1150 may comprise logic and memory blocks. The lowest level L1 cell 1152 of the apparatus 1150 may be configured similar to the micro block 1140 of the apparatus shown in FIG. 9B. A number of cell blocks may be arranged in a cluster and may communicate with one another via local interconnects 1162, 1164. Individual clusters may form higher level cell, e.g., cell L2, denoted as 1154 in FIG. 9d. Similarly, several L2 clusters may communicate with one another via a second level interconnect 1166 and form a super-cluster L3, denoted as 1156 in FIG. 9D. The super-clusters 1154 may communicate via a third level interconnect 1168 and may form a next level cluster. It will be appreciated by those skilled in the arts that the hierarchical structure of the apparatus 1150, comprising four cells-per-level, is merely one exemplary implementation, and other implementations may comprise more or fewer cells per level, and/or fewer or more levels.

Different cell levels (e.g., L1, L2, L3) of the apparatus 1150 may be configured to perform functionality various levels of complexity. In some implementations, individual L1 cells may process in parallel different portions of the visual input (e.g., encode individual pixel blocks, and/or encode motion signal), with the L2, L3 cells performing progressively higher level functionality (e.g., object detection). Individual ones of L2, L3, cells may perform different aspects of operating a robot with one or more L2/L3 cells processing visual data from a camera, and other L2/L3 cells operating motor control block for implementing lens motion what tracking an object or performing lens stabilization functions.

The neuromorphic apparatus 1150 may receive input (e.g., visual input) via the interface 1160. In one or more implementations, applicable for example to interfacing with computerized spiking retina, or image array, the apparatus 1150 may provide feedback information via the interface 1160 to facilitate encoding of the input signal.

The neuromorphic apparatus 1150 may provide output via the interface 1170. The output may include one or more of an indication of recognized object or a feature, a motor command, a command to zoom/pan the image array, and/or other outputs. In some implementations, the apparatus 1150 may perform all of the I/O functionality using single I/O block (not shown).

The apparatus 1150, in one or more implementations, may interface to external fast response memory (e.g., RAM) via a high bandwidth memory interface (not shown), thereby enabling storage of intermediate network operational parameters (e.g., spike timing, neuron state, and/or other parameters). In one or more implementations, the apparatus 1150 may interface to external memory via a lower bandwidth memory interface (not shown) to facilitate program loading, operational mode changes, retargeting, and/or other operations. Network node and connection information for a current task may be saved for future use and flushed. Previously stored network configuration may be loaded in place of the network node and connection information for the current task, as described for example in commonly owned and co-pending U.S. patent application Ser. No. 13/487,576, entitled "DYNAMICALLY RECONFIGURABLE STOCHASTIC LEARNING APPARATUS AND METHODS", incorporated, supra.

In one or more implementations, one or more portions of the apparatus 1150 may be configured to operate one or more learning rules, as described for example in commonly owned and co-pending U.S. patent application Ser. No. 13/487,576 entitled "DYNAMICALLY RECONFIGURABLE STOCHASTIC LEARNING APPARATUS AND METHODS", filed Jun. 4, 2012, incorporated herein by reference in its entirety. In one such implementation, one block (e.g., the L3 block 1156) may be used to process input received via the interface 1160 and to provide a reinforcement signal to another block (e.g., the L2 block 1156) via interval interconnects 1166, 1168.

One or more of the methodologies comprising partial degree of freedom learning and/or use of reduced CDOF robotic controller described herein may facilitate training and/or operation of robotic devices. In some implementations, a user interface may be configured to operate a subset of robot's CDOF (e.g., one joint of a two joint robotic manipulator arm). The methodologies of the present disclosure may enable a user to train complex robotic devices (e.g., comprising multiple CDOFs) using the reduced CDOF control interface. During initial training of a given CDOF subset, the user may focus on achieving target performance (e.g., placing the manipulator joint at a target orientation) without being burdened by control of the whole robotic device. During subsequent training trials for another CDOF subset, operation of the robot by the user (e.g., the joints 106) may be augmented by the controller output for the already trained CDOF (e.g., the joint 102 in FIG. 1). Such cooperation between the controller and the user may enable the latter to focus on training the second CDOF subset without being distracted by the necessity of controlling the first CDOF subset. The methodology described herein may enable use of simpler remote control devices (e.g., single joystick) to train multiple CDOF robots, more complex tasks, and/or more robust learning results (e.g., in a shorter time and/or with a lower error compared to the prior art).

In one or more implementations, the robot training methodologies described herein may reduce cognitive load on a user of a robot, e.g., by allowing the user to focus on a given CDOF and obviating the need to coordinate multiple control signals for multiple CDOF.

Dexterity requirements placed on a trainer and/or trainer may be simplified as the user may utilize, e.g., a single to train and/or control a complex (e.g., with multiple CDOF) robotic body. Using the partial degree of freedom (cascade) training methodology of the disclosure, may enable use of a simpler (e.g., a single DOF) control interface configured, e.g., to control a single CDOF to control a complex robotic apparatus comprising multiple CDOF.

Partial degree of freedom training may enable the trainer to focus on a subset of DOF that may be more difficult to train, compared to other DOF. Such approach may reduce training time for the adaptive control system as addition as additional training time may be dedicated to the difficult to train DOF portion without retraining (and potentially confusing) a better behaving DOF portion.

By gradually training one or more DOF of a robot, operator involvement may be gradually reduced. For example, the trainer may provide occasional corrections to CDOF that may require an improvement in performance switching from one to another DOF as needed.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. This description is in no way meant to be limiting, but rather should be taken as illustrative of the general principles of the technology. The scope of the disclosure should be determined with reference to the claims.

What is claimed is:

1. A method of training a controller of a robot, the method comprising:
receiving at least one input by the controller, the controller including a plurality of layers forming a multi-layer neuron network, the plurality of layers including an input layer and an output layer, the input layer including a first set of plurality of neurons and the output layer including a second set of plurality of neurons, the first set of plurality of neurons being connected to the second set of plurality of neurons via a plurality of connections;
generating at least one output by the second set of plurality of neurons based on the at least one input; and
transmitting the at least one output to a plurality of actuators, the at least one output configured to effect multiple degrees of freedom of the robot,
wherein each of the plurality of connections of the first set of plurality of neurons and the second set of plurality of neurons being assigned an efficacy value, the efficacy value of the first set of plurality of neurons is modified independently of the efficacy value of the second set of plurality of neurons such that the multiple degrees of freedom of the robot are not trained contemporaneously.

2. A robotic apparatus, comprising:
at least one controller configured to execute computer readable instructions to,
receive at least one input by the controller, the controller including a plurality of layers forming a multi-layer neuron network, the plurality of layers including an input layer and an output layer, the input layer including a first set of plurality of neurons and the output layer including a second set of plurality of neurons, the first set of plurality of neurons being connected to the second set of plurality of neurons via a plurality of connections;
generate at least one output by the second set of plurality of neurons based on the at least one input; and
transmit the at least one output to a plurality of actuators, the at least one output configured to effect multiple degrees of freedom of the robot,
wherein each of the plurality of connections of the first set of plurality of neurons and the second set of plurality of neurons being assigned an efficacy value, the efficacy value of the first set of plurality of neurons is modified independently of the efficacy value of the second set of plurality of neurons such that the multiple degrees of freedom of the robot are not trained contemporaneously.

3. A non-transitory computer readable medium having computer readable instructions stored thereon, that when executed by cause the controller to;
receive at least one input by the controller, the controller including a plurality of layers forming a multi-layer neuron network, the plurality of layers including an input layer and an output layer, the input layer including a first set of plurality of neurons and the output layer including a second set of plurality of neurons, the first set of plurality of neurons being connected to the second set of plurality of neurons via a plurality of connections;

generate at least one output by the second set of plurality of neurons based on the at least one input; and transmit the at least one output to a plurality of actuators, the at least one output configured to effect multiple degrees of freedom of the robot, wherein each of the plurality of connections of the first set of plurality of neurons and the second set of plurality of neurons being assigned an efficacy value, the efficacy value of the first set of plurality of neurons is modified independently of the efficacy value of the second set of plurality of neurons such that the multiple degrees of freedom of the robot are not trained contemporaneously.

4. The method of claim 1, wherein the output layer precedes the input layer such that the second set of plurality of neurons provides a feedback signal to the first set of plurality of neurons.

5. The method of claim 1, wherein the input layer corresponds to a feature extraction layer that is configured to respond to the at least one input.

6. The method of claim 1, wherein the efficacy value includes a latency parameter, the latency parameter corresponding to time difference of the at least one input from the first set of plurality of neurons to the second set of plurality of neurons.

7. The method of claim 1, further comprising:
optimizing performance of the robot by minimizing average value of a performance function; and
adjusting the plurality of connections between the first and second sets of plurality of neurons based on the at least one input.

8. The method of claim 1, further comprising:
training a first subset of the plurality of actuators to operate in accordance with a first degree of freedom based on the efficacy value; and
training a second subset of plurality of actuators to operate in accordance with a second degree of freedom based on the efficacy value.

9. The method of claim 8, wherein,
the training of the first subset of plurality of actuators is done at a first time interval and the training of the second subset of plurality of actuators is done at a different second time interval, the second time interval occurs after the first time interval, and
the efficacy value of each of the plurality of connections is updated during the second time interval.

10. The method of claim 1, further comprising: updating the efficacy value of each of the plurality of connections.

11. The robotic apparatus of claim 2, wherein the output layer precedes the input layer such that the second set of plurality of neurons provides a feedback signal to the first set of plurality of neurons.

12. The robotic apparatus of claim 2, wherein the input layer corresponds to a feature extraction layer that is configured to respond to the at least one input.

13. The robotic apparatus of claim 2, wherein the efficacy value includes a latency parameter, the latency parameter corresponding to time difference of the at least one input from the first set of plurality of neurons to the second set of plurality of neurons.

14. The robotic apparatus of claim 2, wherein the computer readable instructions further cause the controller to,
optimize performance of the robot by minimizing average value of a performance function; and
adjust the plurality of connections between the first and second sets of plurality of neurons based on the at least one input.

15. The robotic apparatus of claim 2, wherein the computer readable instructions further cause the controller to,
train a first subset of the plurality of actuators to operate in accordance with a first degree of freedom based on the efficacy value; and
train a second subset of plurality of actuators to operate in accordance with a second degree of freedom based on the efficacy value.

16. The robotic apparatus of claim 15, wherein,
the training of the first subset of plurality of actuators is done at a first time interval and the training of the second subset of plurality of actuators is done at a different second time interval, the second time interval occurs after the first time interval, and
the efficacy value of each of the plurality of connections is updated during the second time interval.

17. The non-transitory computer readable medium of claim 3, wherein the output layer precedes the input layer such that the second set of plurality of neurons provides a feedback signal to the first set of plurality of neurons.

18. The non-transitory computer readable medium of claim 3, wherein the input layer corresponds to a feature extraction layer that is configured to respond to the at least one input.

19. The non-transitory computer readable medium of claim 3, wherein the efficacy value includes a latency parameter, the latency parameter corresponding to time difference of the at least one input from the first set of plurality of neurons to the second set of plurality of neurons.

20. The non-transitory computer readable medium of claim 3, wherein the computer readable instructions further cause the controller to,
optimize performance of the robot by minimizing average value of a performance function; and
adjust the plurality of connections between the first and second sets of plurality of neurons based on the at least one input.

* * * * *